（12）United States Patent
Uemura et al.

(10) Patent No.: US 8,488,561 B2
(45) Date of Patent: Jul. 16, 2013

(54) MOBILE COMMUNICATION SYSTEM, BASE STATION APPARATUS, AND METHOD TO REDUCE INTER-CELL INTERFERENCE FOR SAME

(75) Inventors: Katsunari Uemura, Osaka (JP); Waho Oh, Osaka (JP); Yasuyuki Kato, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/525,285

(22) PCT Filed: Jan. 25, 2008

(86) PCT No.: PCT/JP2008/051125
§ 371 (c)(1),
(2), (4) Date: Aug. 24, 2009

(87) PCT Pub. No.: WO2008/093621
PCT Pub. Date: Aug. 7, 2008

(65) Prior Publication Data
US 2010/0075689 A1    Mar. 25, 2010

(30) Foreign Application Priority Data
Jan. 31, 2007    (JP) .................................. 2007-022102

(51) Int. Cl.
*H04W 4/00*    (2009.01)

(52) U.S. Cl.
USPC .......................................... 370/332; 370/338

(58) Field of Classification Search
None
See application file for complete search history.

(56) References Cited

U.S. PATENT DOCUMENTS

| 5,566,165 | A | * | 10/1996 | Sawahashi et al. | ........... 370/342 |
| 5,781,861 | A | * | 7/1998 | Kang et al. | ..................... 455/442 |
| 5,799,004 | A | * | 8/1998 | Keskitalo et al. | ............. 370/335 |
| 6,028,851 | A | * | 2/2000 | Persson et al. | ................ 370/329 |
| 6,044,067 | A | * | 3/2000 | Suzuki | .......................... 370/252 |

(Continued)

FOREIGN PATENT DOCUMENTS
EP    1434455 A1    6/2004
EP    1596524 A1    11/2005

(Continued)

OTHER PUBLICATIONS

3GPP et al. "Technical Specification Group Radio Access Network; Physical Layer Aspects for Evolved UTRA" Release 7. TR 25.814 V1.5.0 (May 2006) Technical Report.., pp. 1-125.

(Continued)

*Primary Examiner* — Marsha D Banks Harold
*Assistant Examiner* — Hooman Houshmand
(74) *Attorney, Agent, or Firm* — Birch, Stewart, Kolasch & Birch, LLP

(57) ABSTRACT

To improve throughput of the whole system while reducing power consumption, in a mobile communication system comprising a mobile station apparatus and a base station apparatus, the base station apparatus creates an interference information table based on channel quality of an uplink channel, and transmits the interference information indicator table to the mobile station apparatus. The mobile station apparatus determines a state of interference in an uplink frequency band based on the interference information indicator table, determines a frequency band of a measurement pilot channel used to determine received quality, and makes a request to the base station apparatus for a transmission resource. For example, the mobile station apparatus determines a frequency band with lowest interference among the uplink frequency bands as a frequency band of the measurement pilot channel.

3 Claims, 25 Drawing Sheets

U.S. PATENT DOCUMENTS

| | | | |
|---|---|---|---|
| 6,434,390 B2* | 8/2002 | Rahman | 455/440 |
| 6,493,331 B1 | 12/2002 | Walton et al. | |
| 6,771,934 B2 | 8/2004 | Demers et al. | |
| 6,771,943 B2 | 8/2004 | Kianush | |
| 2002/0114295 A1 | 8/2002 | Takahiro et al. | |
| 2004/0072571 A1 | 4/2004 | Halonen et al. | |
| 2004/0076132 A1* | 4/2004 | Tiirola et al. | 370/335 |
| 2004/0125773 A1* | 7/2004 | Wilson et al. | 370/337 |
| 2004/0162093 A1 | 8/2004 | Bevan et al. | |
| 2004/0190482 A1* | 9/2004 | Baum et al. | 370/347 |
| 2005/0169202 A1* | 8/2005 | Ratasuk et al. | 370/312 |
| 2005/0201327 A1 | 9/2005 | Kim et al. | |
| 2005/0276242 A1* | 12/2005 | Goto et al. | 370/328 |
| 2006/0083210 A1* | 4/2006 | Li et al. | 370/343 |
| 2006/0233110 A1 | 10/2006 | Yang et al. | |
| 2007/0082619 A1 | 4/2007 | Zhang et al. | |
| 2007/0147287 A1 | 6/2007 | Jalil et al. | |
| 2007/0168326 A1 | 7/2007 | Das et al. | |
| 2007/0274343 A1 | 11/2007 | Nishio | |
| 2008/0233901 A1 | 9/2008 | Ebiko et al. | |
| 2008/0304582 A1 | 12/2008 | Miyoshi et al. | |
| 2008/0304584 A1 | 12/2008 | Nishio et al. | |

FOREIGN PATENT DOCUMENTS

| | | |
|---|---|---|
| JP | 2008-72540 A | 3/2008 |
| JP | 2008-537404 A | 9/2008 |
| WO | WO 00/60896 A1 | 10/2000 |

OTHER PUBLICATIONS

3GPP et al. "Uplink inter cell interface mitigation and text proposal", Nokia, TSG RAN WG1 #44 Meeting, Denver, USA, Feb. 13-17, 2006, R1-060298, 5 pages.

3GPP et al. "Uplink power control for EUTRA: Optimizing the trade-off between Cell-Edge and Cell-Average Throughputs.", Texas Instruments, TSG RAN WG1 Meeting # 47, Riga, Latvia, Nov. 6-10, 2006. R1-063231, 7 pages.

3GPP et al. "Transmission Power Control in E-UTRA Uplink", NTT DoCoMo, Sharp, Toshiba Corporation, TSG RAN WG1 Meeting #47, Riga, Latvia, Nov. 6-10, 2006, R1-063316, p. 1-8.

3GPP et al. "Physical layer aspects for evolved Universal Terrestrial Radio Access (UTRA)", 3GPP TR 25.814 V7.1.0, Sep. 2006, pp. 71-104.

3GPP et al. "Analysis of Inter-cell Power Control for Interface Management in E-UTRA UL", Qualcomm Europe, 3GPP TSG RAN WG1 Meeting #47, Riga, Latvia, Nov. 6-10, 2006, R1-063446, pp. 1-17.

Alcatel-Lucent, "On the Overload Indicator Interworking with ICIC", 6.3.3 Inter-Cell Interference Coordination, 3GPP TSG-RAN WG1 #51bis, Jan. 14-18, 2008, R1-080447, 7 pages.

Ericsson, "Inter-cell Interference Coordination for E-UTRA-Overload Indicator for Uplink Power Control", TSG-RAN WG1 #49bis, Jun. 25-29, 2007, R1-073038, 2 pages.

European Search Report dated Aug. 4, 2010 issued for the European Patent Application EP10006590.

European Search Report dated Aug. 4, 2010 issued for the European Patent Application EP10006591.

European Search Report dated Jun. 16, 2010 issued for the European Patent Application EP08703937.

Japanese language International Search Report mailed May 26, 2009 for PCT/JP2009/055503.

MCC Support, "Report of 3GPP TSG RAN WG1 #51bis v1.0.0", 3GPP TSG RAN WG1 Meeting #52, Feb. 11-15, 2008, R1-080631, 75 pages.

MCC, "Approved minutes of 3GPP TSG RAN WG1 #46 in Tallinn", 3GPP TSG RAN WG1 Meeting #46bis, Oct. 9-13, 2006, R1-063013, 97 pages.

Motorola, "Uplink Inter-Cell Power Control: X2 Messages", 3GPP TSG RAN1#52, Feb. 11-15, 2008, R1-080751, 1 page.

Nokia Siemens Networks, Nokia, "Uplink ICIC and usage of OI for overload coordination", 3GPP TSG RAN WG1 Meeting #51, Nov. 5-9, 2007, R1-074891, 4 pages.

Qualcomm Europe, "Details on Inter-cell Interference Coordination", 3GPP TSG-RAN WG1 #51-bis, Jan. 14-18, 2007, R1-080491, 21 pages.

Telecom Italia et al, "Way forward on UL ICIC/Overload Indicator for LTE", 6.4.3 Inter-cell Interference Coordination, 3GPP TSG RAN WG1 #51, Nov. 5-9, 2007, R1-075050, 2 pages.

U.S. Notice of Allowance issued on May 23, 2012 in U.S. Appl. No. 12/831,759.

U.S. Advisory Action dated Jun. 10, 2011 for copending U.S. Appl. No. 12/831,759.

U.S. Office Action dated Jan. 28, 2011 for copending U.S. Appl. No. 12/831,759.

U.S. Office Action dated Mar. 2, 2011 for copending U.S. Appl. No. 12/831,774.

U.S. Office Action dated Nov. 15, 2010 for copending U.S. Appl. No. 12/831,774.

U.S. Office Action dated Oct. 4, 2010 for copending U.S. Appl. No. 12/831,759.

U.S. Office Action dated Oct. 18, 2011 for copending U.S. Appl. No. 12/831,759.

U.S. Office Action dated Jan. 25, 2012 for copending U.S. Appl. No. 12/831,759.

* cited by examiner

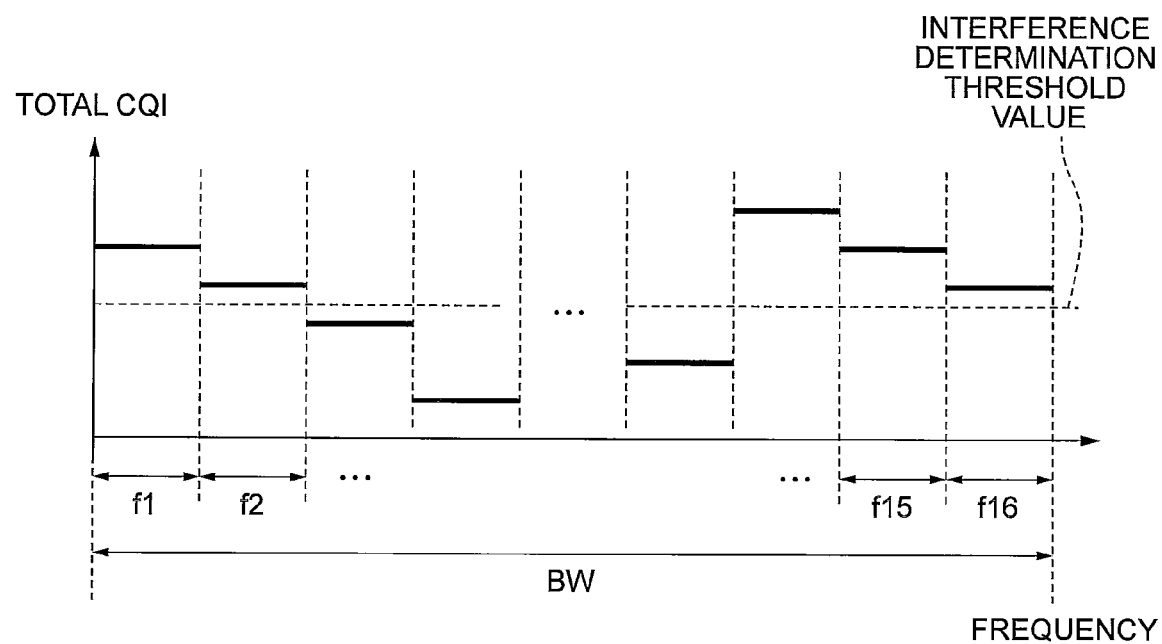

|  | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| CELL1 | 1 | 1 | 0 | 0 | 0 | 1 | 1 | 0 | 1 | 0 | 0 | 1 | 0 | 1 | 0 | 0 |
| CELL2 | 1 | 1 | 0 | 0 | 1 | 0 | 1 | 1 | 1 | 1 | 0 | 0 | 0 | 1 | 1 | 0 |
| CELL3 | 1 | 1 | 1 | 1 | 0 | 0 | 1 | 0 | 0 | 0 | 0 | 0 | 0 | 0 | 0 | 1 |

| | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| 1.25MHz | 3 | 3 | 1 | 1 | 1 | 1 | 3 | 1 | 2 | 1 | 0 | 1 | 0 | 2 | 1 | 1 |

(b)

| | f1-f4 | f2-f5 | f3-f6 | f4-f7 | f5-f8 | f6-f9 | f7-f10 | f8-f11 | f9-f12 | f10-f13 | f11-f14 | f12-f15 | f13-f16 |
|---|---|---|---|---|---|---|---|---|---|---|---|---|---|
| 5MHz | 8 | 6 | 4 | 6 | 6 | 7 | 7 | 4 | 4 | 2 | 3 | 4 | 4 |

(c)

| | f1-f8 | f2-f9 | f3-f10 | f4-f11 | f5-f12 | f6-f13 | f7-f14 | f8-f15 | f9-f16 |
|---|---|---|---|---|---|---|---|---|---|
| 10MHz | 14 | 13 | 11 | 10 | 10 | 9 | 10 | 8 | 8 |

(d)

| | f1-f4 | f5-f8 | f9-f12 | f13-f16 |
|---|---|---|---|---|
| 5MHz | 8 | 6 | 4 | 6 |

(e)

| | f1-f8 | f9-f16 |
|---|---|---|
| 10MHz | 14 | 8 |

- 10MHz MEASUREMENT PILOT CHANNEL #1
- 10MHz MEASUREMENT PILOT CHANNEL #2
- 5MHz MEASUREMENT PILOT CHANNEL #1
- 5MHz MEASUREMENT PILOT CHANNEL #2
- 1.25MHz MEASUREMENT PILOT CHANNEL #n
- DATA CHANNEL
- PHYSICAL UPLINK CONTROL CHANNEL

|         | f1 | f2 | f3 | f4 | f13 | f14 | f15 | f16 |
|---------|----|----|----|----|-----|-----|-----|-----|
| 1.25MHz | 3  | 3  | 1  | 1  | 0   | 2   | 1   | 1   |

|  | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| 1.25MHz | 1.8 | 1.8 | 0.3 | 0.3 | 0.5 | 1 | 1.8 | 0.5 | 1.5 | 0.5 | 0 | 1 | 0 | 1.5 | 0.5 | 0.3 |

FIG.28

| | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| 1.25MHz | 0.2 | 0.2 | -0.3 | -0.3 | -0.5 | 1 | 0.2 | -0.5 | 0.5 | -0.5 | -0.8 | 1 | -0.8 | 0.5 | -0.5 | -0.3 |

| | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| CELL IN SERVING AREA | 1 | 0 | 1 | 0 | 0 | 1 | 0 | 1 | 0 | 0 | 1 | 0 | 0 | 1 | 1 | 1 |
| NEIGHBORING CELL | 1.8 | 1.8 | 0.3 | 0.3 | 0.5 | 1 | 1.8 | 0.5 | 1.5 | 0.5 | 0 | 1 | 0 | 1.5 | 0.5 | 0.3 |

TRANSMISSION BAND WIDTH OF MEASUREMENT PILOT CHANNEL (=Bq)

$Fm = Bq \times p$

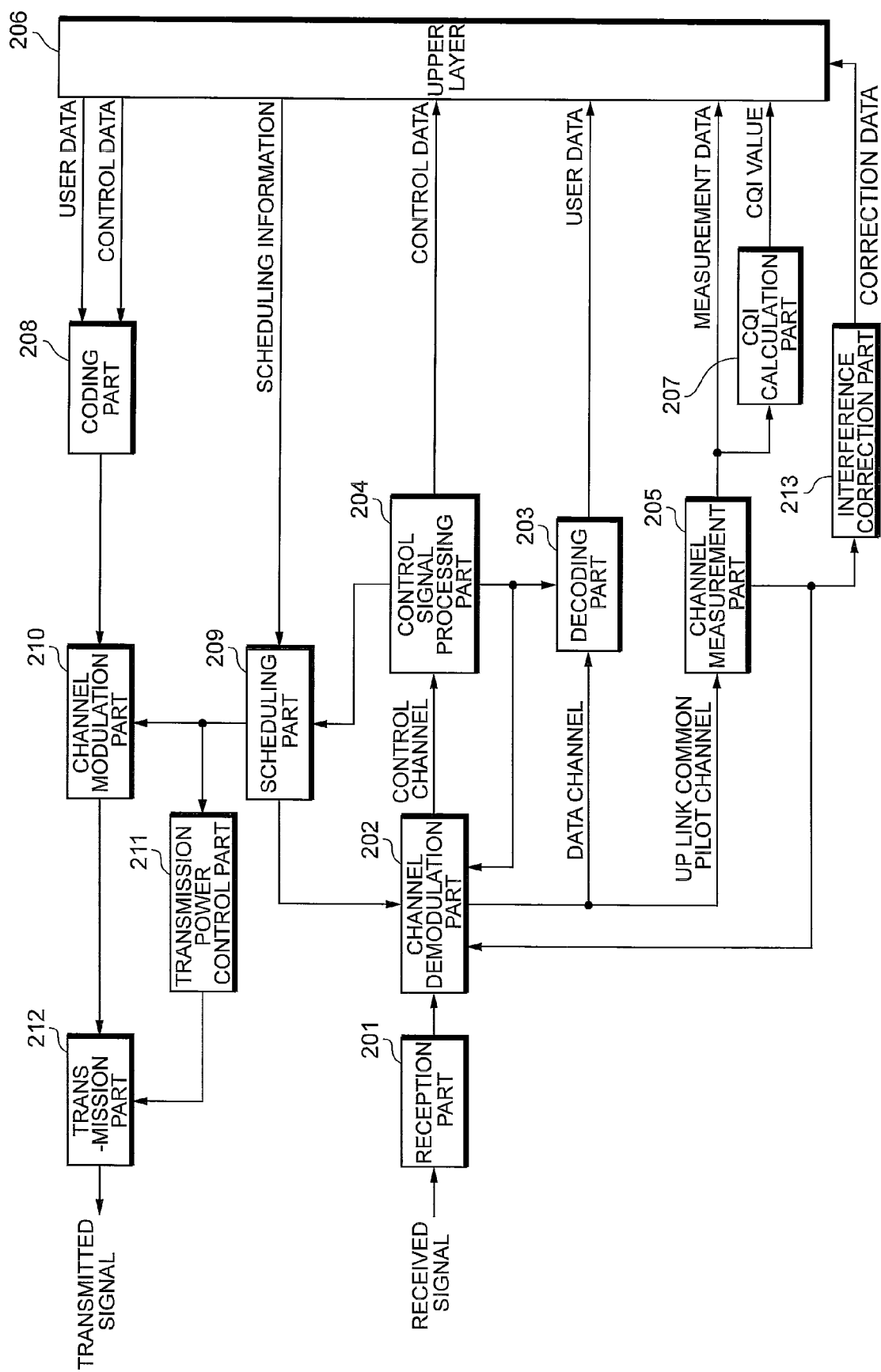

MOBILE COMMUNICATION SYSTEM, BASE STATION APPARATUS, AND METHOD TO REDUCE INTER-CELL INTERFERENCE FOR SAME

TECHNICAL FIELD

The present invention relates to a technique to establish data communication by making use of a plurality of subcarriers and, more particularly, to a mobile communication system, a base station apparatus, and a mobile station apparatus that realize improvement of throughput of the whole system by reducing inter-cell interference.

BACKGROUND ART

At present, Evolved Universal Terrestrial Radio Access (hereinafter, referred to as "EUTRA") for the purpose of increasing the communication speed by introducing part of a technique having been discussed for the fourth generation into the third generation frequency band is discussed by the standardization group 3GPP (3rd Generation Partnership Project) (for example, refer to non-patent document 1).

It has been determined that the OFDMA (Orthogonal Frequency Division Multiplexing Access) scheme that is robust against multi-path interference and suitable for high-speed transmission is adopted as a communication scheme for EUTRA. In addition, in order to improve the uplink throughput of a mobile station on a cell edge and to increase the capacity of the whole cell, the introduction of a technique, called an interference coordination, for the purpose of suppressing inter-cell interference in an uplink transmission is widely discussed (for example, refer to non-patent document 1).

As an interference coordination, a plurality of methods has been proposed. As one of them, a method has been proposed, in which the frequency band that can be used in a system is divided into several parts, mobile stations are divided into several groups based on the transmission power, downlink received quality, etc., each group is associated with a divided frequency band, and a mobile station makes a transmission only in a corresponding frequency band (for example, refer to non-patent document 2). Non-patent document 2 has introduced a method for improving the throughput of transmission data without increasing an amount of interference between uplink cells by setting higher target quality of base station reception power in the corresponding frequency band as the distance between the motile station and the base station becomes smaller.

On the other hand, another method has been proposed, in which the amount of interference between uplink cells is suppressed by only the adjustment of transmission power without division of a frequency band (for example, refer to non-patent document 3 and non-patent document 4). Non-patent document 3 has introduced a transmission power control method for suppressing inter-cell interference by taking into consideration interference that affects neighboring cells in addition to interference given by a path-loss within cell in the serving area and neighboring cells. Non-patent document 4 has introduced a method, in which an amount of interference given by neighboring cells is measured for each cell and when the amount of interference given exceeds a fixed threshold value, a report is made using a load indicator or individual mobile stations are notified and a mobile station that has received the load indicator reduces transmission power in order to reduce interference. Non-patent document 1: 3GPP TR (Technical Report) 25.814, V1.5.0 (2006-5), Physical Layer Aspects for Evolved UTRA. Non-patent document 2: Nokia, "Uplink inter cell interference mitigation and text proposal", 3GPP TSG RAN WG1 Meeting #44, Denver, USA, 13-17 Feb., 2006, R1-060298 Non-patent document 3: Texas Instruments, "Uplink Power Control for EUTRA: Optimizing the Trade-off between Cell-Edge and Cell-Average Throughputs", 3GPP TSG RAN WG1 Meeting #47, Riga, Latvia, 6-10, Nov., 2006, R1-063231 Non-patent document 4: NTT DoCoMo, et al, "Transmission Power Control in E-UTRA Uplink", 3GPP TSG RAN WG1 Meeting #47, Riga, Latvia, 6-10, November, 2006, R1-063316TBD

DISCLOSURE OF THE INVENTION

Problem to be Solved by the Invention

However, as to the interference coordination method described above, in which the frequency band is divided, there is a problem that the frequency diversity effect is reduced because the frequencies that the mobile station can make use of are divided. Further, there is another problem that the capacity is deteriorated when there is a number of mobile stations of the same quality in a cell.

Further, as to the method described above, in which the amount of interference between uplink cells is reduced by the adjustment of transmission power, there is a problem that throughput is reduced on the contrary in part of the frequency band because the amount of interference between uplink cells is measured for each cell and even when a frequency band actually with low interference is used, control is taken so that the transmission power of the mobile stations in the whole cell is uniformly reduced indiscriminately.

Furthermore, as to the method described above, in which the transmission power of the mobile station is reduced using the load indicator, there is a problem that it is not possible to correctly reflect the amount of interference given at a timing of actual transmission because the amount of interference varies considerably depending on the presence of a mobile station of burst transmission. In order to reflect the amount more correctly, it is required to increase the update frequency of the load indicator, however, there will arise another problem that the power consumption of the mobile station increases because the reception frequency of the mobile station is increased at the same time.

The present invention has been developed the above-mentioned problems being taken into consideration and an object thereof is to provide a mobile communication system, a base station apparatus, and a mobile station apparatus capable of improving the throughput of the whole system while reducing power consumption.

Means for Solving the Problem (1) In order to achieve the above-mentioned object, the present invention takes the following means. That is, the mobile communication system according to the present invention is characterized by being a mobile communication system comprising a mobile station apparatus and a base station apparatus, wherein the base station apparatus divides an uplink channel frequency band into a predetermined number of bands and creates an interference information indicator table that shows the relative magnitude of interference in each frequency band based on channel quality for each of the divided frequency bands and the mobile station apparatus performs a data transmission in accordance with the allocation of transmission resource based on the interference information indicator table created by the base station apparatus.

As described above, based on the interference information indicator table created in the base station apparatus, the mobile station apparatus performs a data transmission in accordance with the allocation of transmission resource based on the interference information indicator table created by the base station apparatus. Due to this, it is possible to perform scheduling of a frequency band with low interference in the base station apparatus by selecting a frequency band with low interference in the mobile station apparatus, and therefore, the throughput of the whole system can be improved. Further, by selecting a frequency band with low interference, the transmission power when transmitting data can be suppressed, and therefore, it is made possible to realize the reduction in power consumption. As a result, it is made possible to improve the throughput of the whole system while reducing power consumption.

(2) The mobile communication system according to the present invention is characterized by being a mobile communication system comprising a mobile station apparatus and a base station apparatus, wherein the base station apparatus comprises a cell edge determination step which determines whether or not the mobile station apparatus is located on a cell edge, an interference determination step for determining a state of interference for each predetermined frequency band based on channel quality of the mobile station apparatus determined to be located on a cell edge by the cell edge determination step, and a table creation step which creates an interference information indicator table based on the determination result for each frequency band by the interference determination step, and the mobile station apparatus performs a data transmission in accordance with the allocation of transmission resource based on the interference information indicator table created by the base station apparatus.

As described above, based on the channel quality of the uplink channel from the mobile station apparatus determined to be located on a cell edge, the state of interference is determined for each frequency band, and the interference information indicator table is created in accordance with the determination result, and therefore, it is possible to notify the mobile station apparatus of the magnitude of inter-cell interference for each frequency band only by making a measurement of a channel quality indicator and a simple determination of threshold value. Then, in the mobile station apparatus, the notified state of inter-cell interference is determined and a frequency band with low interference is determined as a frequency band of a measurement pilot channel, and thereby, it is possible to receive the measurement pilot channel in a frequency band with low interference and perform scheduling based thereon in the base station apparatus, and therefore, the throughput of the whole system can be improved.

(3) The mobile communication system according to the present invention is characterized in that the interference determination step corrects channel quality for each predetermined frequency band using correction data created from a demodulation pilot channel and the table creation step which creates the interference information indicator table based on the corrected channel quality for each predetermined frequency band.

As described above, the channel quality for each predetermined frequency band is corrected using the correction data created from the demodulation pilot channel and the interference information indicator table is created based on the corrected channel quality for each predetermined frequency band, and therefore, it is made possible to create an interference information indicator table with higher precision using a demodulation pilot channel with low interference.

(4) The mobile communication system according to the present invention is characterized in that the mobile station apparatus comprises, a mobile station apparatus side table creation step which creates an interference information indicator table on the mobile station apparatus side by calculating for each predetermined frequency band a value registered in at least one of the interference information indicator tables obtained from the base station apparatus in the serving area or the base station apparatus in the non-serving area, and a frequency band determination step which determines a state of interference for each uplink frequency band based on the mobile station apparatus side interference information indicator table and determining a frequency band for which a request for the allocation of transmission resource is made.

As described above, the interference information indicator table on the mobile station apparatus side is created by calculating a value registered in the interference information indicator table for each predetermined frequency band, the state of interference of the uplink frequency band is determined based on the interference information indicator table on the mobile station apparatus side, and the request for the allocation of transmission resource is made, and therefore, it is made possible to accurately determine the state of interference in accordance with the predetermined frequency band width in the mobile station apparatus and make a request for the allocation of transmission resource in a frequency band with low interference.

(5) The mobile communication system according to the present invention is characterized in that the mobile station side table creation step calculates a value registered in the interference information indicator table without duplication for each frequency band of a measurement pilot channel of the mobile station apparatus.

As described above, the value registered in the interference information indicator table is calculated without duplication for each frequency band of the measurement pilot channel of the mobile station apparatus, and therefore, it is made possible to appropriately create the interference information indicator table even when, for example, it is not possible to freely set a frequency band of the measurement pilot channel in order to secure orthogonality.

(6) The mobile communication system according to the present invention is characterized in that the frequency band determination step determines a frequency band with a minimum calculated value in the mobile station apparatus side interference information indicator table as a frequency band of the measurement pilot channel.

As described above, a frequency band with a minimum calculated value in the interference formation indicator table on the mobile station apparatus side is determined as a frequency band of the measurement pilot channel, and therefore, it is possible to receive the measurement pilot channel in a frequency band with low interference and perform scheduling based thereon in the base station apparatus. As a result, the throughput of the whole system can be improved. Further, it is possible to suppress transmission power when transmitting data by selecting a frequency band with low interference, and therefore, it is made possible to realize the reduction in power consumption.

(7) The mobile communication system according to the present invention is characterized in that the frequency band determination step determines a frequency band with a maximum calculated value in the mobile station apparatus side interference information indicator table as a frequency band of the measurement pilot channel.

As described above, a frequency band with a maximum calculated value in the interference information indicator table on the mobile station apparatus side is determined as a frequency band of the measurement pilot channel, and therefore, it is possible to autonomously multiplex mobile station apparatuses located in difference cells in different frequency bands and suppress the inter-cell interference.

(8) The mobile communication system according to the present invention is characterized in that the frequency band determination step determines a frequency band with a maximum calculated value, which is obtained by subtracting a value registered in the interference information indicator table of the base station apparatus in the non-serving area from a value registered in the interference information indicator table of the base station apparatus in the serving area, as a frequency band of the measurement pilot channel.

As described above, in the mobile station apparatus side interference information indicator table, a frequency band with a maximum calculated value, which is obtained by subtracting a value registered in the interference information indicator table of the base station apparatus in the non-serving area from a value registered in the interference information indicator table of the base station apparatus in the serving area, is determined as a frequency band of the measurement pilot channel, and therefore, it is possible to divide for each cell a frequency band to be used in mobile stations located in different cells and suppress the inter-cell interference.

(9) The mobile communication system according to the present invention is characterized in that the frequency band determination step determines a frequency band with a maximum calculated value in the base station apparatus in the serving area and with a minimum calculated value in the base station apparatus in the non-serving area based on the mobile station apparatus side interference information indicator table as a frequency band of the measurement pilot channel.

As described above, based on the mobile station apparatus side interference information indicator table, a frequency band with a maximum calculated value in the base station apparatus in the serving area and with a minimum calculated value in the base station apparatus in the non-serving area is determined as a frequency band of the measurement pilot channel. Due to this, mobile station apparatuses located in different cells are multiplexed autonomously in different frequency bands and a frequency band with less influence of interference on cells (neighboring cells) in the non-serving area can be selected from among them, and therefore, it is made possible to further suppress the inter-cell interference.

(10) The mobile communication system according to the present invention is characterized in that the mobile station apparatus transmits the measurement pilot channel in accordance with a frequency hopping pattern and the frequency band determination step performs scheduling not to transmit the measurement pilot channel in a frequency band with a maximum calculated value in the base station apparatus in the non-serving area among uplink frequency bands based on the mobile station apparatus side interference information indicator table.

As described above, based on the mobile station apparatus side interference information indicator table, the scheduling not to transmit the measurement pilot channel is performed in a frequency band with a maximum calculated value in the base station apparatus in the non-serving area among uplink frequency bands, and therefore, the influence of interference is averaged by frequency hopping and at the same time, it does not happen any longer that a transmission resource is allocated to a frequency band strongly affected by the inter-cell interference from the cells (neighboring cells) in the non-serving area and it is made possible to reduce the inter-cell interference.

(11) The mobile communication system according to the present invention is characterized in that the mobile station apparatus transmits the measurement pilot channel in accordance with a frequency hopping pattern and the frequency band determination step performs scheduling to transmit the measurement pilot channel at a reduced transmission power in a frequency band with a maximum calculated value in the base station apparatus in the non-serving area among uplink frequency bands based on the mobile station apparatus side interference information indicator table.

As described above, based on the mobile station apparatus side interference information indicator table, the scheduling to transmit the measurement pilot channel at a reduced transmission power is performed in a frequency band with a maximum calculated value in the base station apparatus in the non-serving area among the uplink frequency bands, and therefore, the influence of interference is averaged by frequency hopping and at the same time, the transmission power in a frequency band strongly affected by inter-cell interference from cells (neighboring cells) in the non-serving area is reduced and it is made possible to reduce the inter-cell interference.

(12) The mobile communication system according to the present invention is characterized in that the mobile station apparatus comprises a mobile station apparatus side table creation step which creates an interference information indicator table on the mobile station apparatus side by calculating for each predetermined frequency band a value registered in at least one of the interference information indicator tables obtained from the base station apparatus in the serving area or the base station apparatus in the non-serving area and a transmission power control step which performs transmission power control of an uplink channel based on the mobile station apparatus side interference information indicator table.

As described above, the mobile station apparatus side interference information indicator table is created by calculating for each predetermined frequency band a value registered in the interference information indicator table and transmission power control is performed based on the interference information indicator table on the mobile station apparatus side, and therefore, it is possible to appropriately perform transmission power control in accordance with a predetermined frequency band width in the mobile station apparatus and it is made possible to reduce reception errors in the base station apparatus and obtain the effect of reduction in power consumption.

(13) The mobile communication system according to the present invention is characterized in that the transmission power control step performs transmission power control based on a first increment/decrement value when the amount of interference given to the base station apparatus in the serving area is larger than a threshold value, a second increment/decrement value when the amount of interference given to the base station apparatus in the serving area is smaller than the threshold value, a third increment/decrement value when the amount of interference given to the base station apparatus in the non-serving area is larger than the threshold value, and a fourth increment/decrement value when the amount of interference given to the base station apparatus in the non-serving area is smaller than the threshold value based on the mobile station apparatus side interference information indicator table.

Because transmission power control is performed as described above, it is possible to reduce reception errors in the base station apparatus due to a rise in transmission power when performing a data transmission in a frequency band with much interference in a cell in the serving area, and therefore, the throughput of the mobile station apparatus is improved. On the contrary, when performing a data transmission in a frequency band with low interference in a cell in the serving area, an unwanted increase in transmission power is suppressed by reducing transmission power and this leads to the power-saving in the mobile station apparatus. Further, when performing a data transmission in a frequency band with much interference in a peripheral cell (cell in the non-serving area), the transmission power is reduced, and therefore, the amount of interference given to the peripheral cell is reduced and the quality of the peripheral cell is improved. On the contrary, when performing a data transmission in a frequency band with low interference in a peripheral cell (cell in the non-serving area), even if the transmission power is increased, the amount of interference of the peripheral cell is originally small, and therefore, it is ensured that an increase in interference does not affect the peripheral cell so strongly and because the transmission power is increased in a cell in the serving area, reception errors in the base station apparatus are reduced and the throughput of the mobile station apparatus is improved.

(14) The mobile communication system according to the present invention is characterized in that the transmission power control step performs transmission power control based on a first target quality increment/decrement value when the amount of interference given to the base station apparatus in the serving area is larger than a threshold value, a second target quality increment/decrement value when the amount of interference given to the base station apparatus in the serving area is smaller than the threshold value, a third target quality increment/decrement value when the amount of interference given to the base station apparatus in the non-serving area is larger than the threshold value, and a fourth target quality increment/decrement value when the amount of interference given to the base station apparatus in the non-serving area is smaller than the threshold value based on the mobile station apparatus side interference information indicator table.

Because the transmission power control is performed as described above, it is possible to obtain the same effect as that when transmission power is increased/reduced in accordance with the state of interference in the base station apparatus etc. in the serving area.

(15) A base station apparatus according to the present invention is characterized by being a base station apparatus that communicates with a mobile station apparatus, comprising a cell edge determination step which determines whether or not the mobile station apparatus is located on a cell edge, an interference determination step for determining a state of interference for each predetermined frequency band based on channel quality of an uplink channel from the mobile station apparatus determined to be located on a cell edge by the cell edge determination step, a table creation step which creates an interference information indicator table based on the determination result for each frequency band by the interference determination step, and a transmission step which transmits the interference information indicator table to the mobile station apparatus or another base station apparatus.

As described above, based on the channel quality of the uplink channel from the mobile station apparatus determined to be located on a cell edge, the state of interference is determined for each frequency band, and the interference information indicator table is created in accordance with the determination result, and therefore, it is possible to notify the mobile station apparatus of the magnitude of inter-cell interference for each frequency band only by making a measurement of a channel quality indicator and a simple determination of threshold value. Then, in the mobile station apparatus, the notified state of inter-cell interference is determined and a frequency band with low interference is determined as a frequency band of a measurement pilot channel, and thereby, it is possible to receive the measurement pilot channel in a frequency band with low interference and perform scheduling based thereon in the base station apparatus, and therefore, the throughput of the whole system can be improved.

(16) The base station apparatus according to the present invention is characterized in that the interference determination step corrects channel quality for each predetermined frequency band using correction data created from a demodulation pilot channel and the table creation step creates the interference information indicator table based on the corrected channel quality for each predetermined frequency band.

As described above, the channel quality for each predetermined frequency band is corrected using the correction data created from the demodulation pilot channel and the interference information indicator table is created based on the corrected channel quality for each predetermined frequency band, and therefore, it is made possible to create an interference information indicator table with higher precision using a demodulation pilot channel with low interference.

(17) A mobile station apparatus according to the present invention is characterized by being a mobile station apparatus that communicates with a base station apparatus comprising a cell edge determination step which determines whether or not the mobile station apparatus is located on a cell edge, an interference determination step for determining a state of interference for each predetermined frequency band based on channel quality of an uplink channel from the mobile station apparatus determined to be located on a cell edge by the cell edge determination step, a table creation step which creates an interference information indicator table based on the determination result for each frequency band by the interference determination step, and a transmission step which transmits the interference information indicator table to the mobile station apparatus or another base station apparatus, or a base station apparatus comprising these components, wherein the interference determination step corrects the channel quality for each predetermined frequency band using correction data created from a demodulation pilot channel and the table creation step creates the interference information indicator table based on the corrected channel quality for each predetermined frequency band, the mobile station apparatus comprising a mobile station apparatus side table creation step which creates an interference information indicator table on the mobile station apparatus side by calculating for each predetermined frequency band a value registered in at least one of the interference information indicator tables obtained from the base station apparatus in the serving area or a plurality of the base station apparatuses in the non-serving area, a frequency band determination step which determines a state of interference for each uplink frequency band based on the interference information indicator table on the mobile station apparatus side and determining a frequency band for which a request for the allocation of transmission resource is made, and a transmission resource request step which requests to the base station apparatus for the transmission resource of the determined frequency band.

As described above, the interference information indicator table on the mobile station apparatus side is created by calculating a value registered in the interference information indicator table for each predetermined frequency band, the state of interference of the uplink frequency band is determined based on the interference information indicator table on the mobile station apparatus side, and the request for the allocation of transmission resource is made, and therefore, it is made possible to accurately determine the state of interference in accordance with the predetermined frequency band width in the mobile station apparatus and make a request for the allocation of transmission resource in a frequency band with low interference.

(18) The mobile station apparatus according to the present invention is characterized in that the mobile station side table creation step calculates a value registered in the interference information indicator table without duplication for each frequency band of the measurement pilot channel.

As described above, the value registered in the interference information indicator table is calculated without duplication for each frequency band of the measurement pilot channel of the mobile station apparatus, and therefore, it is made possible to appropriately create the interference information indicator table even when, for example, it is not possible to freely set a frequency band of the measurement pilot channel in order to secure orthogonality.

(19) The mobile station apparatus according to the present invention is characterized in that the frequency band determination step determines a frequency band with a minimum calculated value in the mobile station apparatus side interference information indicator table as a frequency band of the measurement pilot channel.

As described above, a frequency band with a minimum calculated value in the interference formation indicator table on the mobile station apparatus side is determined as a frequency band of the measurement pilot channel, and therefore, it is possible to receive the measurement pilot channel in a frequency band with low interference and perform scheduling based thereon in the base station apparatus. As a result, the throughput of the whole system can be improved. Further, it is possible to suppress transmission power when transmitting data by selecting a frequency band with low interference, and therefore, it is made possible to realize the reduction in power consumption.

(20) The mobile station apparatus according to the present invention is characterized in that the frequency band determination step determines a frequency band with a maximum calculated value in the mobile station apparatus side interference information indicator table as a frequency band of the measurement pilot channel.

As described above, a frequency band with a maximum calculated value in the interference information indicator table on the mobile station apparatus side is determined as a frequency band of the measurement pilot channel, and therefore, it is possible to autonomously multiplex mobile station apparatuses located in difference cells in different frequency bands and suppress the inter-cell interference.

(21) The mobile station apparatus according to the present invention is characterized in that the frequency band determination step determines a frequency band with a maximum calculated value, which is obtained by subtracting a value registered in the interference information indicator table of the mobile station apparatus in the non-serving area from a value registered in the interference information indicator table of the mobile station apparatus in the serving area, as a frequency band of the measurement pilot channel.

As described above, in the mobile station side interference information indicator table, a frequency band with a maximum calculated value, which is obtained by subtracting a value registered in the interference information indicator table of the base station apparatus in the non-serving area from a value registered in the interference information indicator table of the base station apparatus in the serving area, is determined as a frequency band of the measurement pilot channel, and therefore, it is made possible to divide for each cell a frequency band to be used in mobile stations located in difference cells and suppress the inter-cell interference.

(22) The mobile station apparatus according to the present invention is characterized in that the frequency band determination step determines a frequency band with a maximum calculated value in the base station apparatus in the serving area and with a minimum calculated value in the base station apparatus in the non-serving area based on the mobile station apparatus side interference information indicator table as a frequency band of the measurement pilot channel.

As described above, based on the mobile station apparatus side interference information indicator table, a frequency band with a maximum calculated value in the base station apparatus in the serving area and with a minimum calculated value in the base station apparatus in the non-serving area is determined as a frequency band of the measurement pilot channel. Due to this, mobile station apparatuses located in different cells are multiplexed autonomously in difference frequency bands and a frequency band with less influence of interference on cells (neighboring cells) in the non-serving area can be selected from among them, and therefore, it is made possible to further suppress the inter-cell interference.

(23) The mobile station apparatus according to the present invention is characterized in that the mobile station apparatus transmits the measurement pilot channel in accordance with a frequency hopping pattern and the frequency band determination step performs scheduling not to transmit the measurement pilot channel in a frequency band with a maximum calculated value in the base station apparatus in the non-serving area among uplink frequency bands based on the mobile station apparatus side interference information indicator table.

As described above, based on the mobile station apparatus side interference information indicator table, scheduling not to transmit the measurement pilot channel is performed in a frequency band with a maximum calculated value in the base station apparatus in the non-serving area among uplink frequency bands, and therefore, the influence of interference is averaged by frequency hopping and at the same time, it does not happen any longer that a transmission resource is allocated to a frequency band strongly affected by the inter-cell interference from the cells (neighboring cells) in the non-serving area and it is made possible to reduce the inter-cell interference.

(24) The mobile station apparatus according to the present invention is characterized in that the mobile station apparatus transmits the measurement pilot channel in accordance with a frequency hopping pattern and the frequency band determination step performs scheduling to transmit the measurement pilot channel at a reduced transmission power in a frequency band with a maximum calculated value in the base station apparatus in the non-serving area among uplink frequency bands based on the mobile station apparatus side interference information indicator table.

As described above, based on the mobile station apparatus side interference information indicator table, the scheduling to transmit the measurement pilot channel at a reduced transmission power is performed in a frequency band with a maximum calculated value in the base station apparatus in the non-serving area among the uplink frequency bands, and therefore, the influence of interference is averaged by frequency hopping and at the same time, the transmission power in a frequency band strongly affected by inter-cell interference from cells (neighboring cells) in the non-serving area is reduced and it is made possible to reduce the inter-cell interference.

(25) The mobile station apparatus according to the present invention is characterized by being a mobile station apparatus that communicates with a base station apparatus comprising a cell edge determination step which determines whether or not the mobile station apparatus is located on a cell edge, an interference determination step for determining a state of interference for each predetermined frequency band based on channel quality of an uplink channel from the mobile station apparatus determined to be located on a cell edge by the cell edge determination step, a table creation step which creates an interference information indicator table based on the determination result for each frequency band by the interference determination step, and a transmission step which transmits the interference information indicator table to the mobile station apparatus or another base station apparatus, or a base station apparatus comprising these components, wherein the interference determination step corrects the channel quality for each predetermined frequency band using correction data created from a demodulation pilot channel and the table creation step creates the interference information indicator table based on the corrected channel quality for each predetermined frequency band, the mobile station apparatus comprising a mobile station apparatus side table creation step which creates an interference information indicator table on the mobile station apparatus side by calculating for each predetermined frequency band a value registered in at least one of the interference information indicator tables obtained from the base station apparatus in the serving area or the base station apparatus in the non-serving area, and a transmission power control step which performs transmission power control of an uplink channel based on the interference information indicator table on the mobile station apparatus side.

As described above, the mobile station apparatus side interference information indicator table is created by calculating for each predetermined frequency band a value registered in the interference information indicator table and transmission power control is performed based on the interference information indicator table on the mobile station apparatus side, and therefore, it is possible to appropriately perform transmission power control in accordance with a predetermined frequency band width in the mobile station apparatus and it is made possible to reduce reception errors in the base station apparatus and obtain the effect of reduction in power consumption.

(26) The mobile station apparatus according to the present invention is characterized in that the transmission power control step performs transmission power control based on a first increment/decrement value when the amount of interference given to the base station apparatus in the serving area is larger than a threshold value, a second increment/decrement value when the amount of interference given to the base station apparatus in the serving area is smaller than the threshold value, a third increment/decrement value when the amount of interference given to the base station apparatus in the non-serving area is larger than the threshold value, and a fourth increment/decrement value when the amount of interference given to the base station apparatus in the non-serving area is smaller than the threshold value based on the mobile station apparatus side interference information indicator table.

Because transmission power control is performed as described above, it is possible to reduce reception errors in the base station apparatus due to a rise in transmission power when performing a data transmission in a frequency band with much interference in a cell in the serving area, and therefore, the throughput of the mobile station apparatus is improved. On the contrary, when performing a data transmission in a frequency band with low interference in a cell in the serving area, an unwanted increase in transmission power is suppressed by reducing transmission power and this leads to the power-saving in the mobile station apparatus. Further, when performing a data transmission in a frequency band with much interference in a peripheral cell (cell in the non-serving area), the transmission power is reduced, and therefore, the amount of interference given to the peripheral cell is reduced and the quality of the peripheral cell is improved. On the contrary, when performing a data transmission in a frequency band with low interference in a peripheral cell (cell in the non-serving area), even if the transmission power is increased, the amount of interference of the peripheral cell is originally small, and therefore, it is ensured that an increase in interference does not affect the peripheral cell so strongly and because the transmission power is increased in a cell in the serving area, reception errors in the base station apparatus are reduced and the throughput of the mobile station apparatus is improved.

(27) The mobile station apparatus according to the present invention is characterized in that the transmission power control step performs transmission power control based on a first target quality increment/decrement value when the amount of interference given to the base station apparatus in the serving area is larger than a threshold value, a second target quality increment/decrement value when the amount of interference given to the base station apparatus in the serving area is smaller than the threshold value, a third target quality increment/decrement value when the amount of interference given to the base station apparatus out of the area is larger than the threshold value, and a fourth target quality increment/decrement value when the amount of interference given to the base station apparatus in the non-serving area is smaller than the threshold value based on the mobile station apparatus side interference information indicator table.

Because transmission power control is performed as described above, it is possible to obtain the same effect as that when transmission power is increased/reduced in accordance with the state of interference in the base station apparatus etc. in the serving area.

According to the present invention, based on the interference information indicator table created in the base station apparatus, a data transmission is performed in accordance with the allocation of transmission resource based on the interference information indicator table acquired from the base station apparatus in the mobile station apparatus. Due to this, in the mobile station apparatus, it is possible to perform scheduling of a frequency band with low interference in the base station apparatus by selecting a frequency band with low interference, and therefore, the throughput of the whole system can be improved. Further, by selecting a frequency band with low interference, the transmission power when transmitting data can be suppressed, and therefore, it is made possible to realize reduction in power consumption. As a result, it is made possible to improve the throughput of the whole system while reducing power consumption.

BRIEF DESCRIPTION OF THE DRAWINGS

FIG. 15 is a diagram showing a relationship between the total of CQI and an interference judgment threshold value.

FIG. 16 is a diagram showing an example of an interference information indicator table shown in FIG. 15.

FIG. 19 a diagram showing an example of interference information indicator tables summed in accordance with each transmission band width of various measurement pilot channels.

FIG. 28 is a diagram showing an example of an interference information indicator table created by subtracting a registered value in an interference information indicator table of a peripheral cell from a registered value in an interference information indicator table of a cell in the serving area in a mobile communication system according to a third embodiment of the present invention.

FIG. 33 is a block diagram showing a configuration of a base station included in a mobile communication system according to a sixth embodiment.

Figure 1:
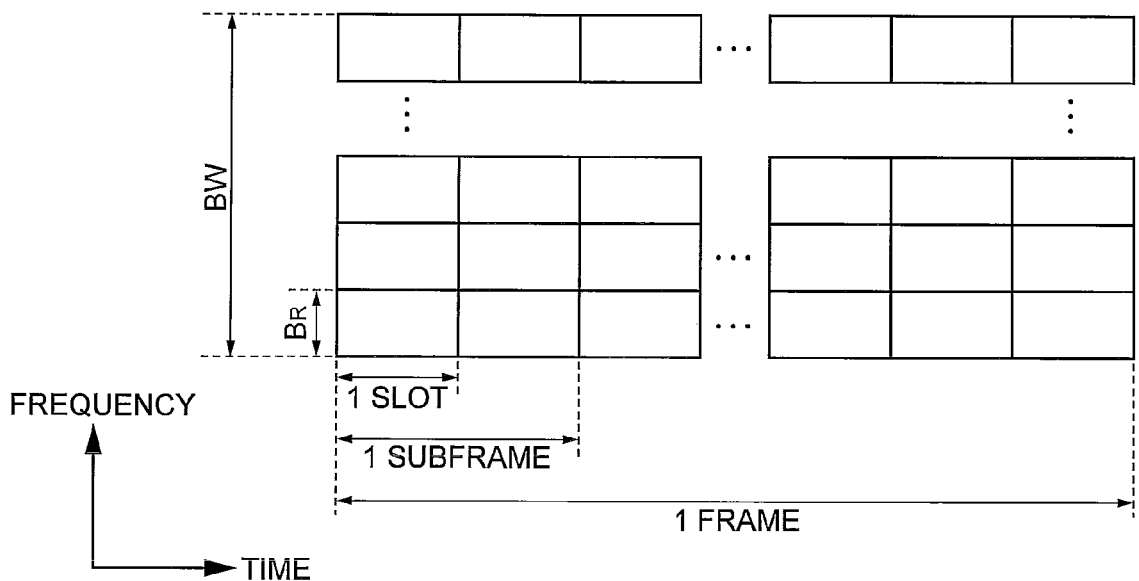
FIG. 1 a diagram showing radio resources partitioned by the frequency band and time region.

EXPLANATIONS OF LETTERS OR NUMERALS 101 reception part
102 channel demodulation part
103 decoding part
104 control signal processing part
105 channel measurement part
106 upper layer
107 interference data processing part
108 scheduling part
109 CQI calculation part
110 coding part
111 channel modulation part
112 transmission power control part
113 transmission part
201 reception part
202 channel demodulation part
203 decoding part
204 control signal processing part
205 channel measurement part
206 upper layer
207 CQI calculation part
208 coding part 209 scheduling part
210 channel modulation part
211 transmission power control part
212 transmission part
213 interference correction part Best Modes For Carrying Out The Invention Hereinafter, embodiments of the present invention are explained with reference to the drawings. Before the explanation of the embodiments of the present invention is given here, a basic technique and a basic concept of a mobile communication system used in the present invention are explained.

FIG. 1 is a diagram showing an example of a radio frame configuration using OFDMA. A radio frame uses as one unit a region configured by a fixed frequency band in which a frequency axis is configured by a set of a plurality of subcarriers and a similarly fixed transmission time interval (subframe). One subframe is configured by a plurality of slots and FIG. 1 shows an example in which two slots are included in one subframe. A region partitioned by the fixed frequency band and the transmission time interval is called a resource block in a down link and a resource unit in an up link. BW in the figure denotes a system band width and $B_R$ denotes a band width of a resource block (or resource unit).

Figure 2:
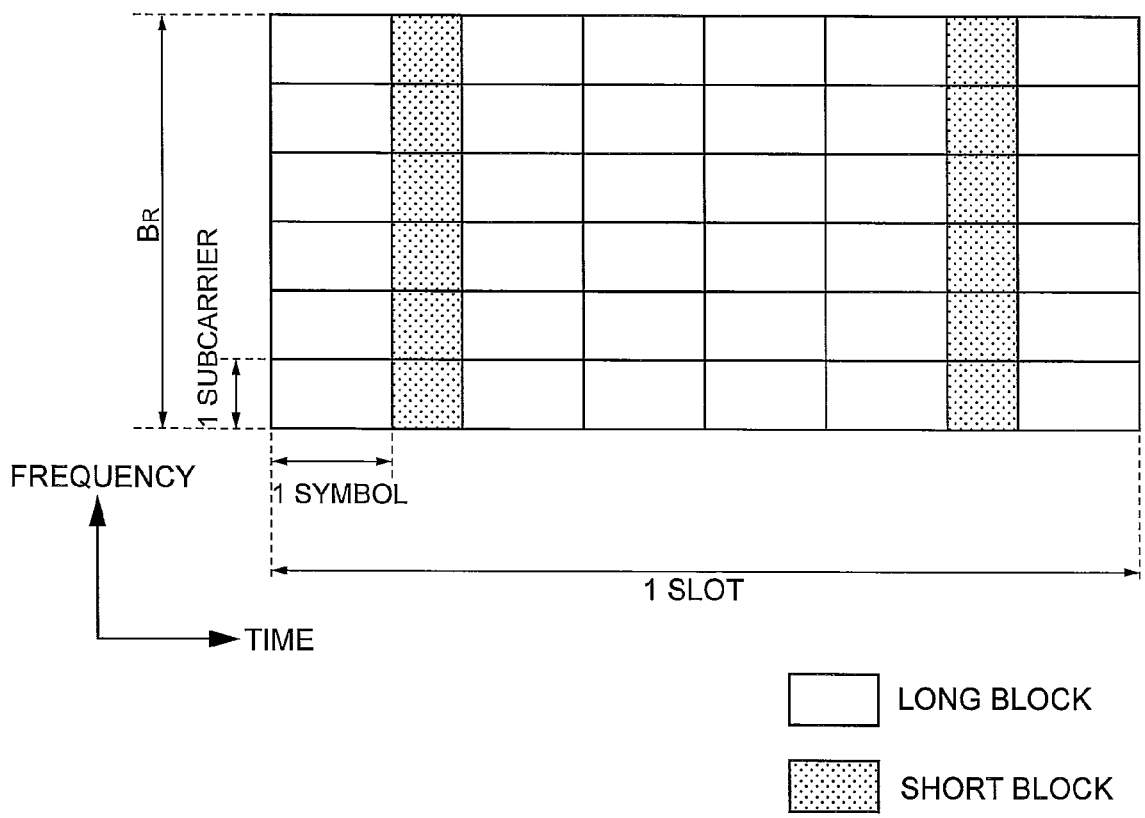
FIG. 2 is a diagram showing an arrangement of short blocks and long blocks in a one uplink slot.

FIG. 2 is a diagram showing an example of a symbol configuration in an uplink slot. An up link slot is configured by eight symbols, that is, six long blocks and two short blocks. The short blocks are arranged in the second symbol from the top and in the second symbol from the last and the long blocks are arranged in the rest of symbols.

Next, a physical channel used in EUTRA and its role are explained briefly below. A physical channel is classified into a data channel and a control channel. Further, as a control channel, there are a synchronization channel, a broadcast channel, a random access channel, a down link common pilot channel, an up link common pilot channel, a physical downlink control channel, and a physical uplink control channel. The up link common pilot channel is sometimes called an up link reference channel and similarly, the down link common pilot channel is called a down link reference channel, however, the essential roles are the same.

The synchronization channel is a channel transmitted from a base station in an already known signal pattern in order for a mobile station apparatus (hereinafter, referred appropriately to as a "mobile station") to establish radio synchronization with a base station apparatus (hereinafter, referred appropriately to as a "base station") and a channel that the mobile station receives first in EUTRA. Only the base station uses the synchronization channel.

The broadcast channel is a channel for broadcasting information used commonly by the mobile stations located in an area not only by a specific mobile station. It is possible for a mobile station to acquire information about a peripheral cell etc. by the broadcast channel. Only the base station uses the broadcast channel.

The random access channel is an uplink channel on a contention base used for uplink transmission when a mobile station is not notified of a radio resource that can be used by the mobile station from the base station. Only the mobile station uses the random access channel.

The down link common pilot channel (hereinafter, referred to as "DL-CPICH") is a channel transmitted from a base station to a mobile station. The mobile station determines the downlink received quality by measuring the received power of QL-CPICH. The received quality is feed back to the base station using a physical uplink control channel as a channel quality indicator (hereinafter, referred to as a "CQI"). The base station performs downlink scheduling based on the feedback CQI.

As received quality, SIR (Signal-to-Interference Ratio), SINR (Signal-to-Interference plus Noise Ratio), SNR (Signal-to-Noise Ratio), CIR (Carrier-to-Interference Ratio), BLER (Block Error Rate), or path loss can be conceived.

The up link common pilot channel (hereinafter, referred to as "UL-CPICH") is a channel transmitted from a mobile station to a base station. The base station determines the received quality of an uplink transmitted signal of the mobile station by measuring the received power of UL-CPICH. The base station performs uplink scheduling based on the received quality. The UL-CPICH calculates variation quantities, such as amplitude, phase, and frequency, of an uplink data channel and is used as a reference channel to demodulate a data channel. Hereinafter, the UL-CPICH used for received quality determination is called a "measurement pilot channel" and the UL-CPICH used for data channel demodulation is called a "demodulation pilot channel" for distinction.

The physical downlink control channel (PDCCH) is a channel transmitted from a base station to a mobile station and used commonly by a plurality of mobile stations. The base station uses the physical downlink control channel for the transmission of transmission timing information and scheduling information (uplink/downlink resource allocation information).

The physical uplink control channel (PUCCH) is a channel transmitted from a mobile station to a base station and the mobile station uses the physical downlink control channel to notify the base station of information, such as CQI (Channel Quality Indicator), HARQ (Hybrid Automatic Repeat Request), and ACK/NACK (Acknowledge/Not Acknowledge).

Figure 3:
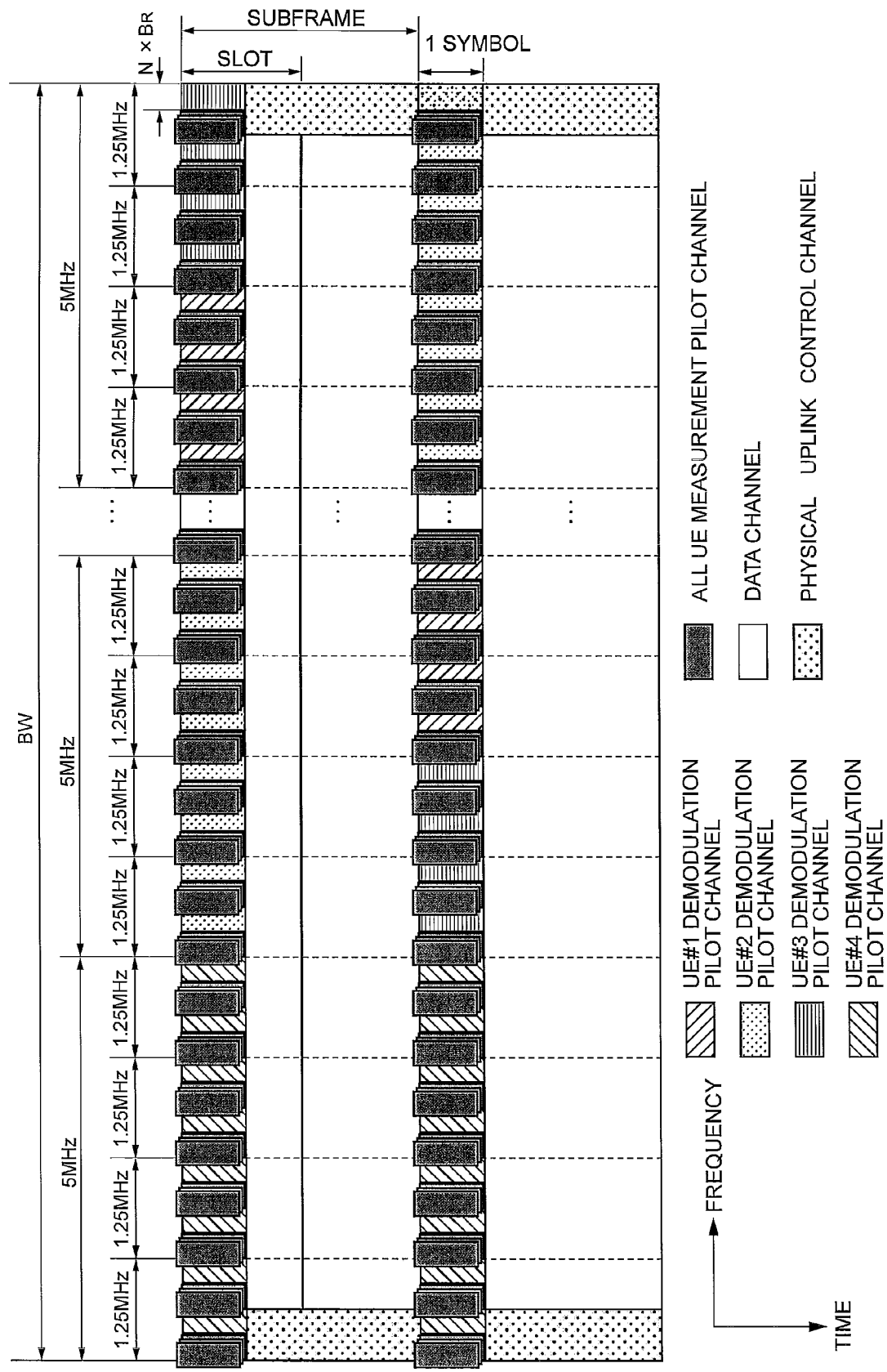
FIG. 3 is a diagram showing an example of channel mapping of measurement pilot channels and demodulation pilot channels in an up link common pilot channel.

FIG. 3 shows an example of an arrangement of uplink channels in EUTRA. The unit of frequency is expressed by Hertz (Hz) according to the International System of Units, however, there is no problem about a system in which the frequency is expressed by the number of resource blocks or resource units, or the number of subcarriers. BW in the figure denotes a system band width. The demodulation pilot channel and the measurement pilot channel in the same mobile station are frequency-division-multiplexed in different frequency bands with the same symbol time and arranged in the distributed scheme (to be described later). The measurement pilot channels between different mobile stations are code-division-multiplexed in the same frequency band with the same symbol time and a plurality of mobile stations commonly uses the same resource. The demodulation pilot channel is allocated only to a mobile station having been scheduled to transmit user data. The physical uplink control channels are arranged on both sides of the system band width. In the rest, data channels are arranged.

Figure 4:
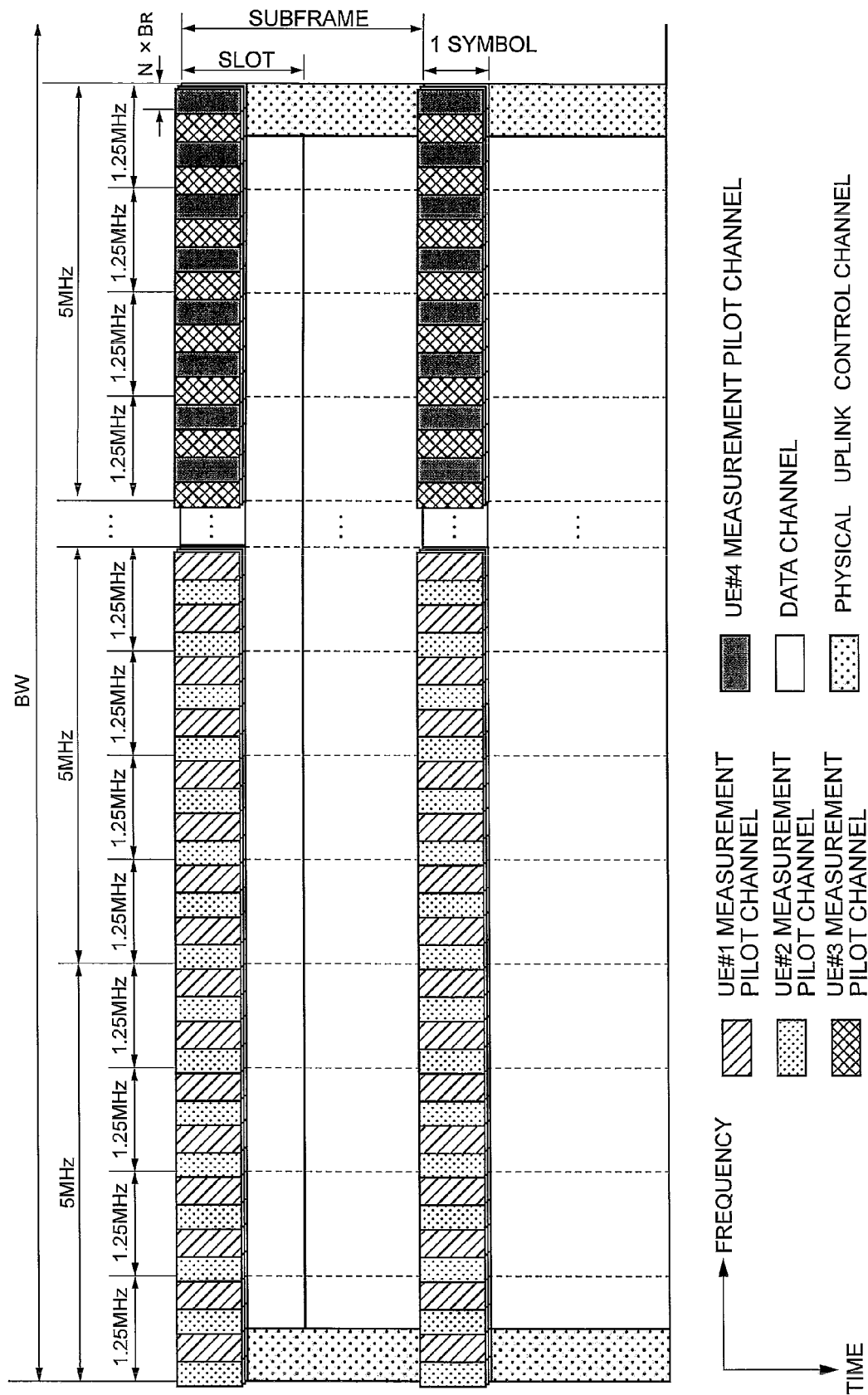
FIG. 4 is a diagram showing another example of channel mapping of measurement pilot channels and demodulation pilot channels in an up link common pilot channel.

FIG. 4 shows another example of an arrangement of uplink channels in EUTRA. BW in the figure denotes a system band width. The measurement pilot channels between mobile stations with different transmission band widths of the measurement pilot channel are frequency-division-multiplexed in different frequency bands with the same symbol time and arranged in the distributed scheme (to be described later), respectively. The measurement pilot channels in mobile stations with the same transmission band width of the measurement pilot channel are code-division-multiplexed in the same frequency band with the same symbol time and a plurality of mobile stations commonly uses the same resource. A difference from FIG. 3 lies in that the measurement pilot channel and the demodulation pilot channel (not shown) are time-multiplexed in FIG. 4 and both are transmitted in different symbol times, that is, both are not transmitted simultaneously in the same symbol time.

Figure 5:
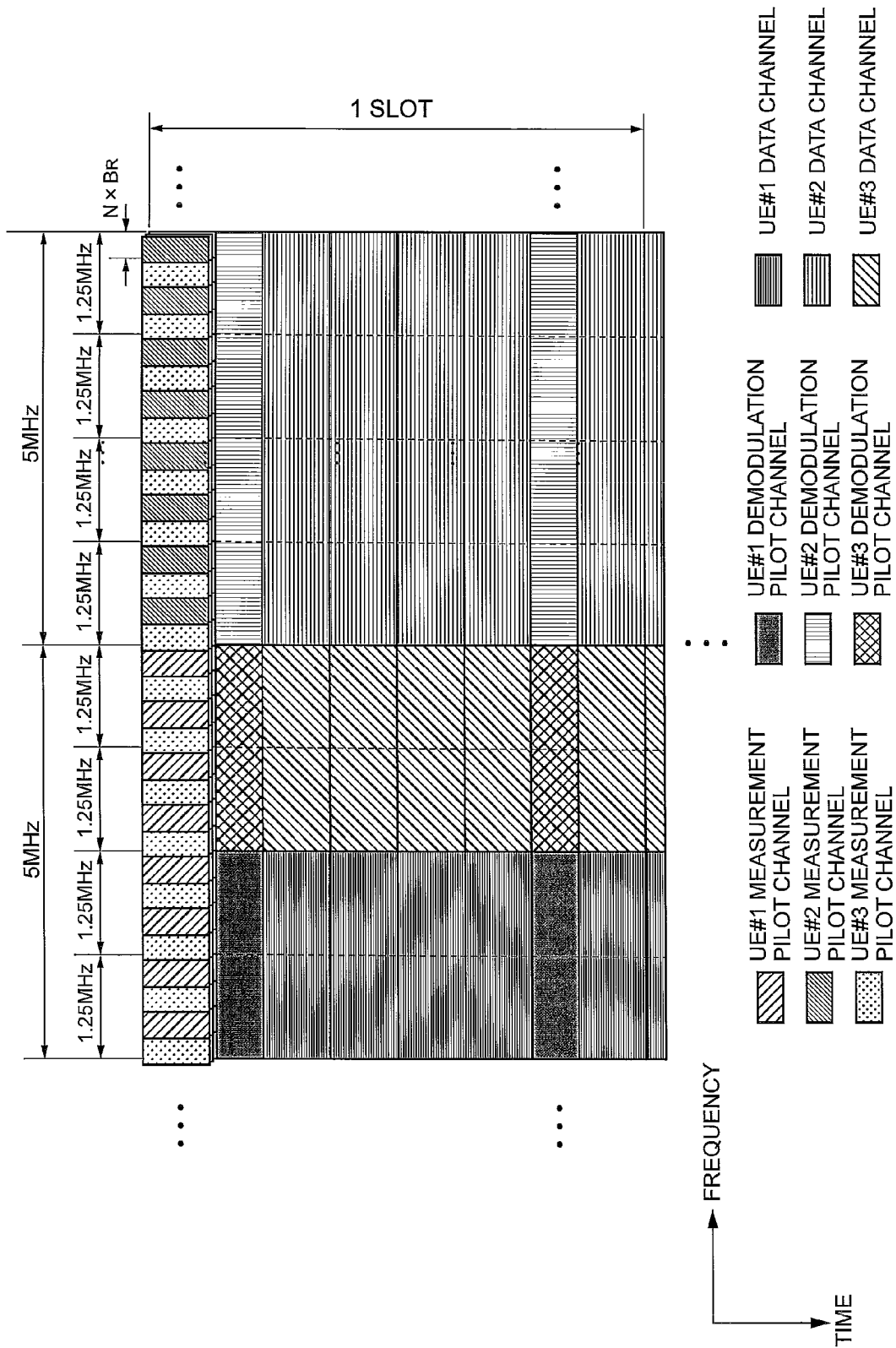
FIG. 5 is a diagram for explaining a relationship between the channel mapping of measurement pilot channels and demodulation pilot channels and data channels in an up link common pilot channel.

FIG. 5 shows a relationship between the demodulation pilot channel and the data channel in the arrangement of uplink channels in EUTRA. The radio resource of a data channel allocated to a certain mobile station is included in the transmission band width of the measurement pilot channel being transmitted by the mobile station. It is necessary for the demodulation pilot channel relating to the data channel to have the same transmission band width as that of the data channel.

In FIG. 3, FIG. 4, and FIG. 5, description is such that the measurement pilot channel is arranged in the first symbol of the subframe, however, according to the present invention, it may be arranged in any symbol position, not limited to the first symbol, and it may be arranged in either the long block or the short block.

The transmission band width of the measurement pilot channel varies depending on the performance of a mobile station that transmits and, for example, it is assumed that there are three kinds of transmission band width: 10 MHz; 5 MHz; and 1.25 MHz. Here, for example, when the system band width BW is 20 MHz and the transmission band width of the mobile station is 10 MHz at maximum, and if it is planned to divide BW into two band widths of 10 MHz for transmission of the measurement pilot channel, the received quality of the measurement pilot channel in the base station will be better when the measurement pilot channel is transmitted in a frequency band with less inter-cell interference, and therefore, throughput is increased as a result. This is explained using FIG. 6.

Figure 6:
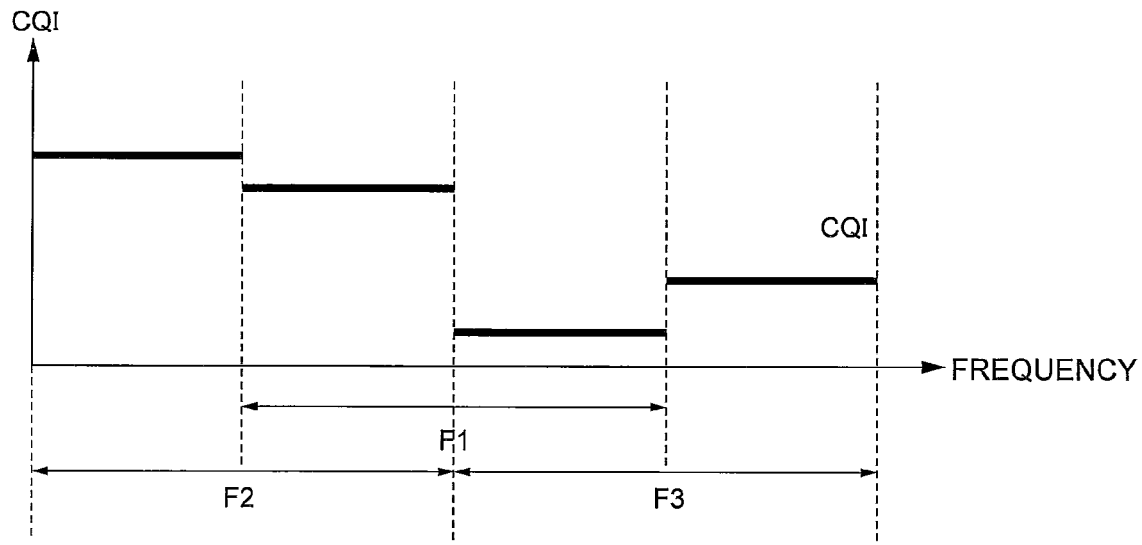
FIG. 6 is a diagram for explaining a relationship between transmission band width of a mobile station and CQI calculated in a base station.

FIG. 6 is an example showing the measurement result of the uplink CQI for each frequency band (of four divisions in this example). Here, when a mobile station is arranged in either position of frequency bands F1 to F3, if the mobile station transmits the measurement pilot channel in F2 in the example in FIG. 6, the base station will receive a good CQI, however, if the mobile station transmits the measurement pilot channel in F1 or F3, the CQI is deteriorated compared to that when F2 is used. The main factor of the deterioration of measurement pilot channel, that is, the factor that a low CQI is determined in the base station, is the distance attenuation and other factors of deterioration include inter-cell interference given by neighboring cells.

Figure 7:
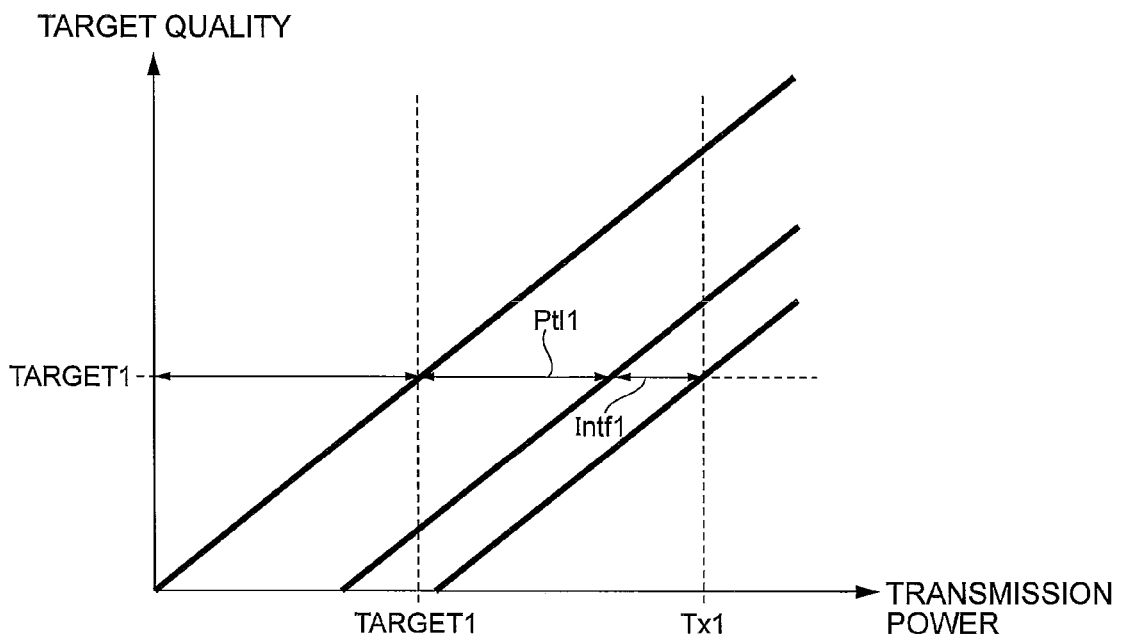
FIG. 7 is a diagram showing a relationship between target quality and mobile station transmission power.

FIG. 7 is a diagram showing an example of a basic power control method in EUTRA. Because it is necessary to guarantee the quality of an uplink data channel, a target quality at the time of reception is determined in advance on the base station side. The target quality is notified to the mobile station via a broadcast channel or physical downlink control channel. The mobile station transmits the uplink data channel at a transmission power that satisfies the target quality. At this time, the mobile station determines the transmission power by adding the amount of attenuation due to path loss and the amount of attenuation due to the amount of interference indicating inter-cell interference for the target quality.

In FIG. 7, when the target quality is Target1, the actual transmission power is a transmission power Tx1, which is obtained by adding path loss Ptl1 and an amount of interference Intf1 to Target1. From FIG. 7, it can be seen that the target quality can be achieved with a less transmission power when the quality is improved (path loss is reduced) or the amount of interference reduces (inter-cell interference is suppressed). It can also be seen that transmission power can be controlled by an increase/decrease in target quality. The power control may include a method in which an offset value inherent to the cell is added to the transmission power, however, this is omitted in this example.

Figure 8:
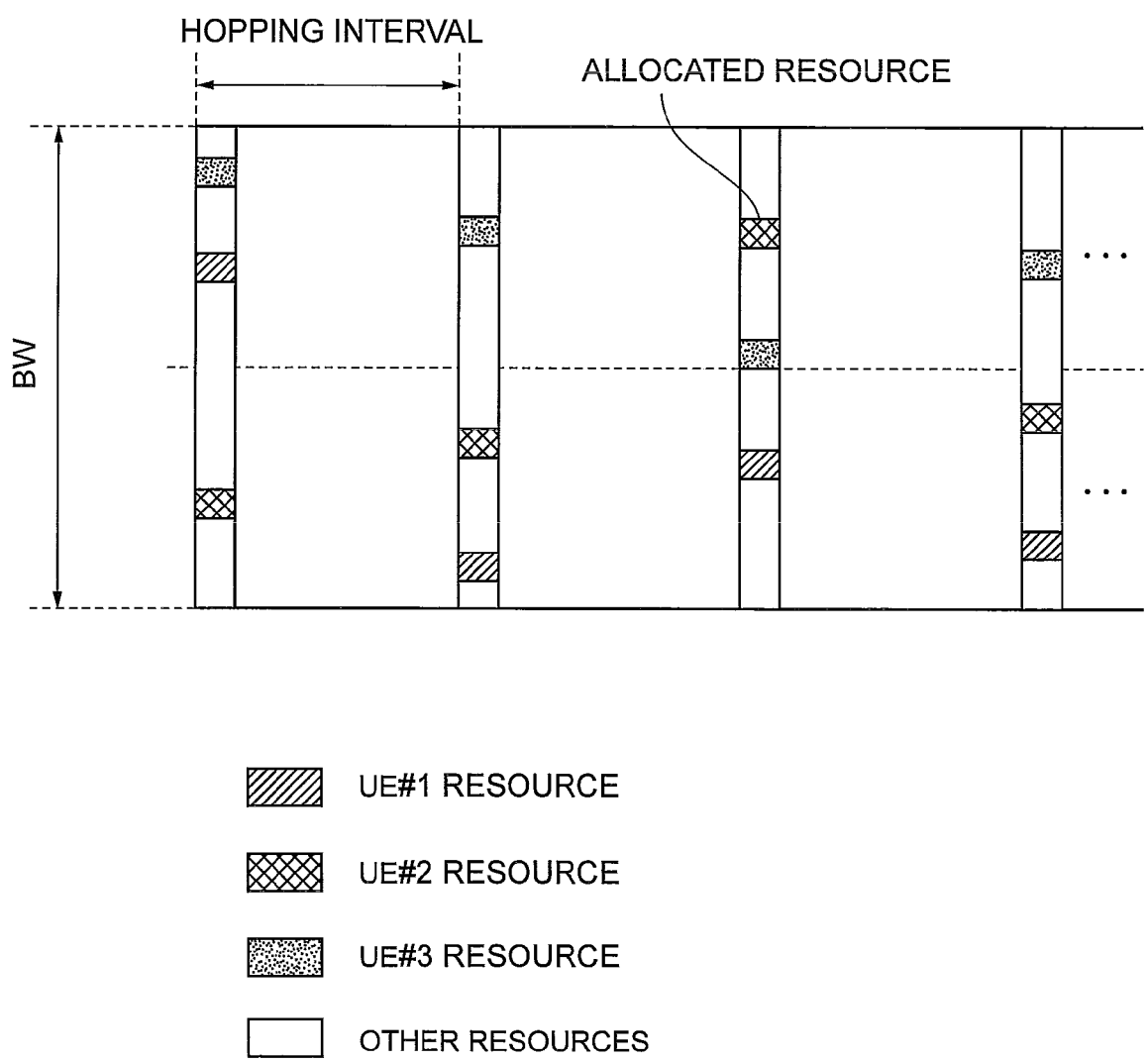
FIG. 8 is a diagram showing an example of frequency hopping control.

FIG. 8 is an example for explaining frequency hopping. To a mobile station or base station, an uplink or downlink radio resource is allocated in different frequencies at a regular time interval (Hopping interval). By the frequency hopping it is possible to obtain a frequency diversity effect due to the use of different frequency bands and an averaging effect of interference. BW in FIG. 8 denotes a system band width and it is shown that resources in different frequency bands are allocated to mobile stations UE#1 to UE#3 for each Hopping interval. This pattern of the frequency hopping is called a Hopping pattern.

(First Embodiment)

Figure 9:
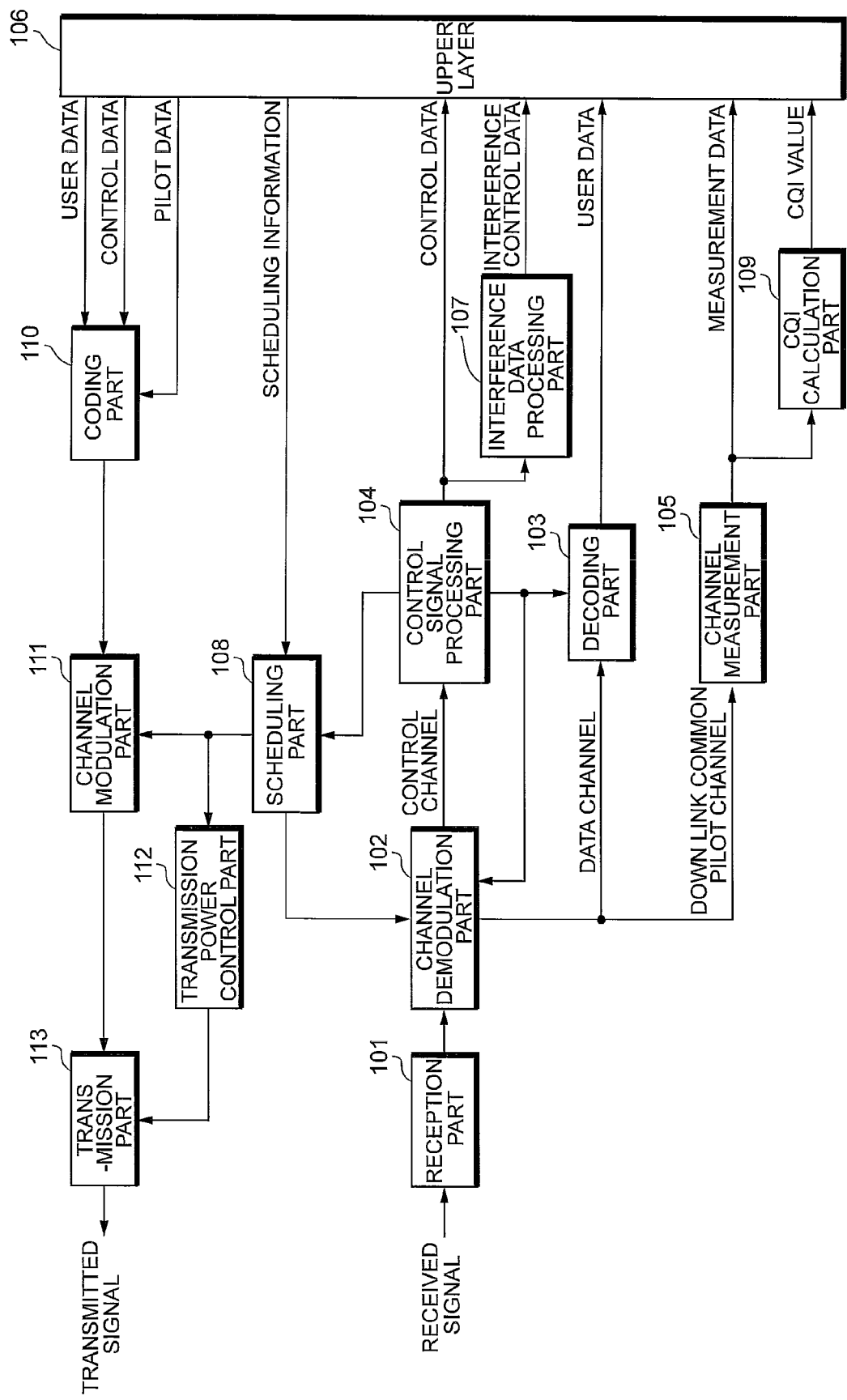
FIG. 9 is a block diagram showing an example of a configuration of a mobile station included in a mobile communication system according to a first embodiment of the present invention.

Hereinafter, a mobile communication system according to a first embodiment of the present invention is explained. FIG. 9 is a block diagram showing an example of a configuration of a mobile station included in the mobile communication system according to the first embodiment of the present invention. A received signal (received signal from a base station) is received in a reception part 101. The received signal is sent to a channel demodulation part 102 and demodulated based on scheduling information input from a scheduling part, to be described later, and classified into a data channel, control channel (physical downlink control channel), and down link common pilot channel (DL-CPICH).

Each classified channel is transmitted as follows. The data channel is transmitted to a decoding part 103, the control channel to a control signal processing part 104, and the down link common pilot channel to a channel measurement part 105. Channels other than those described above are transmitted to respective channel control parts, however, they do not affect the present invention and are omitted.

The decoding part 103 takes out user data and transmits it to an upper layer 106. The control signal processing part 104 takes out control data and transmits it to the upper layer 106. When the taken-out control data includes interference information (interference information indicator table, its details will be described later), the control signal processing part 104 transmits the interference information to an interference data processing part 107. The interference data processing part 107 performs addition/subtraction processing of the amount of interference for each frequency band to update the state into one where the interference information can be used and at the same time, determines the amount of uplink interference for each frequency band from the interference information, and transmits the determination result to the upper layer 106 as interference control data. Scheduling information included in the control channel is transmitted to a scheduling part 108. The channel measurement part 105 measures the received quality of the down link common pilot channel and transmits it to the upper layer 106 as measurement data and at the same time, transmits the received quality to a CQI calculation part 109. The CQI calculation part 109 calculates a CQI from the received quality and transmits it to the upper layer 106 as a CQI value.

As a calculation method of CQI in the CQI calculation part 109, there is a method in which a CQI is found each time from an instantaneous value of DL-CPICH or a method in which a CQI is found by averaging a certain fixed period of reception time, and either may be used. Further, there are a method in which a CQI is found for each DL-CPICH and a method in which a CQI is found by averaging across a certain reception band, and both are included here. Even if calculation methods other than those described above are used, the gist of the present invention is not affected.

On the other hand, from the upper layer 106, user data, control data, and pilot data are input to a coding part 110 and coded as transmission data. Further, from the upper layer 106, scheduling information is input to the scheduling part 108. The user data and control data coded in the coding part 110 are input to a channel modulation part 111. The channel modulation part 111 performs modulation processing of the transmission data in an appropriate modulation scheme in accordance with the scheduling information transmitted from the scheduling part 108. A transmission power control part 112 performs appropriate power control of each channel in accordance with the instruction of the scheduling part 108. Data modulated in the channel modulation part 111 is input to a transmission part 113 and subjected to power control and then transmitted from the transmission power control part 112. Other components of the mobile station do not relate to the present invention and therefore are omitted. The operation of each block is totally controlled by the upper layer 106. The upper layer 106 or the scheduling part 108 constitutes a mobile station side table creation step and a frequency band determination step. The most suitable one as the mobile station side table creation step and the frequency band determination step is the scheduling part 108. Further, the transmission part 13 constitutes a transmission resource request step.

Figure 10:
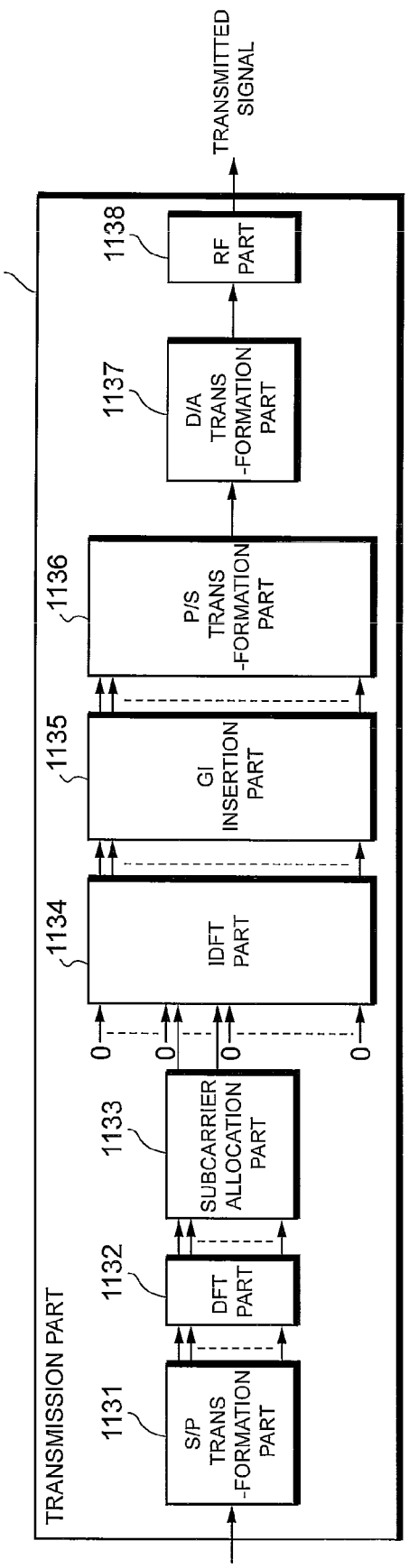
FIG. 10 is a block diagram showing a configuration of a transmission part of a mobile station according to the first embodiment.

FIG. 10 is a block diagram showing a configuration of the transmission part 113 shown in FIG. 9. The transmission data input from the channel modulation part 111 is S/P-transformed in an S/P transformation part 1131 and then a plurality of pieces of time axis data is transformed into frequency data by a DFT part 1132 and the transformed data is arranged in an IDFT part input in a subcarrier allocation part 1133. To an IDFT point without input, 0 is inserted. The data is subjected to IDFT processing in an IDFT part 1134 and after transformed into time axis data again, a guard interval (GI) is inserted in a guard interval insertion part 1135. Then, after subjected to P/S transformation in a P/S transformation part 1136 and D/A transformation in a D/A transformation part 1137 in order, the data is transmitted from an RF part 1138.

Figure 11:
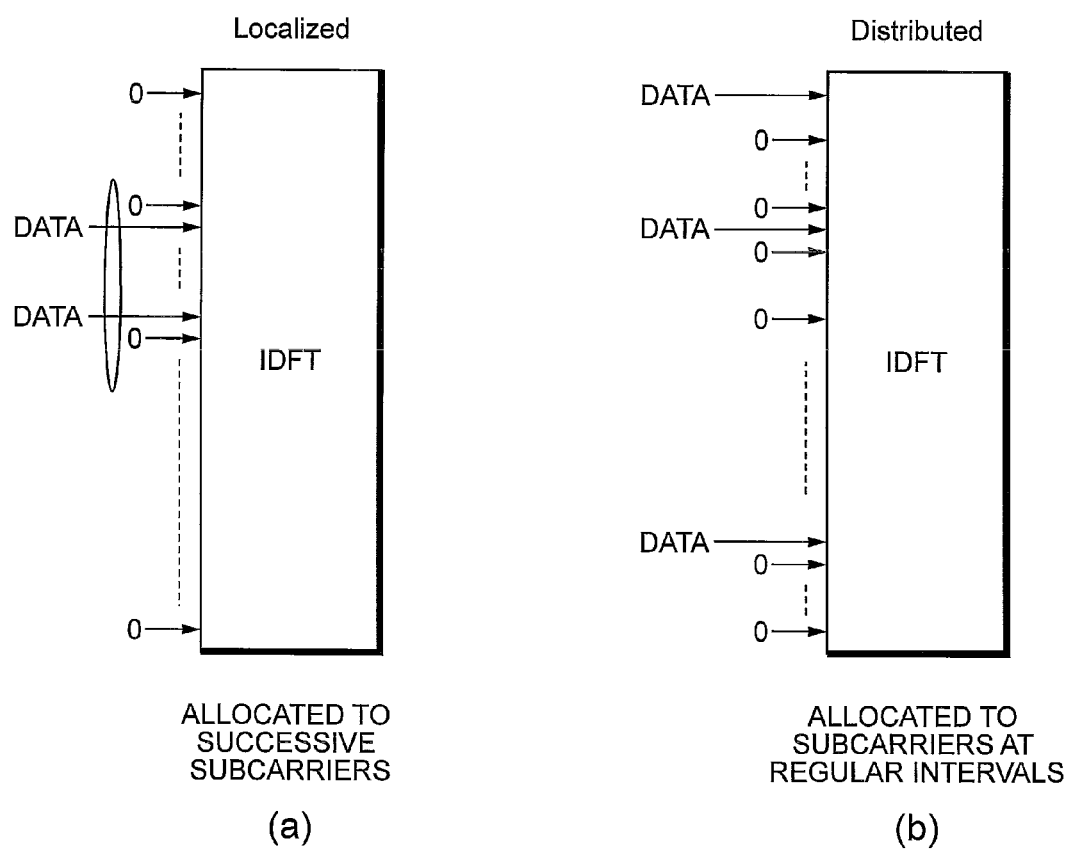
FIG. 11 is a diagram for explaining an allocation method of subcarrier in an IDFT part in a transmission part of a mobile station in the first embodiment.

Here, two methods have been proposed as rules of arrangement of data to be input to the IDFT part 1134. One is a method called a localized scheme and the other is a method called a distributed scheme. A localized arrangement is a scheme in which frequency data after DFT is allocated successively to the input of IDFT as shown in FIG. 11(a). On the other hand, a distributed arrangement is a scheme in which the same data is allocated at regular intervals to the input of IDFT. It is possible for a mobile station to use a transmission format by switching between the localized arrangement and the distributed arrangement in accordance with the kind of channel, purpose, radio propagation environment, etc.

Figure 12:
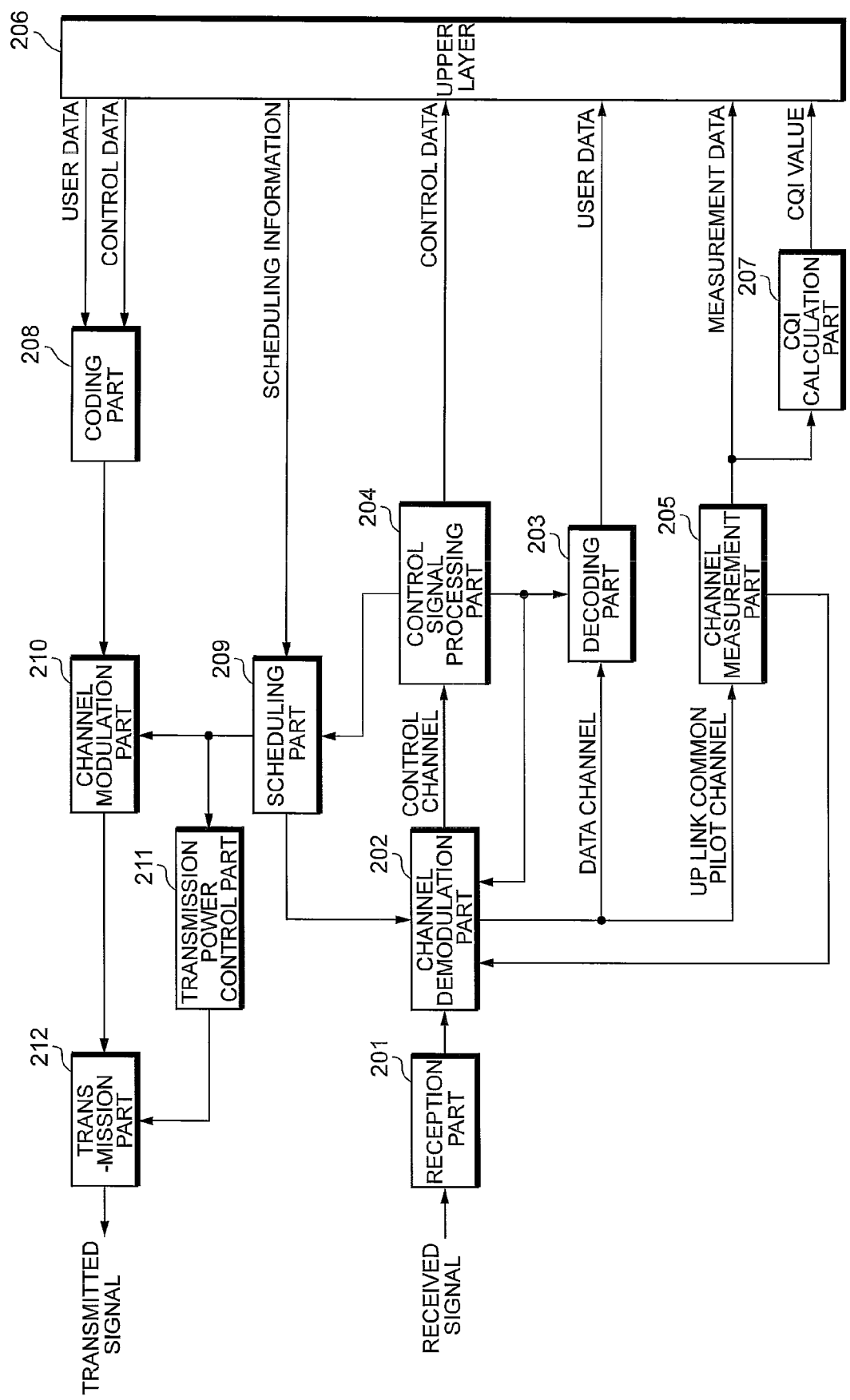
FIG. 12 is a block diagram showing an example of a configuration of a base station included in a mobile communication system according to the first embodiment.

FIG. 12 is a block diagram showing an example of a configuration of a base station included in the mobile communication system according to the first embodiment of the present invention. A received signal (received signal from a mobile station) is received in a reception part 201. The received signal is sent to a channel demodulation part 202 and classified into a data channel, control channel (physical uplink control channel), and up link common pilot channel based on scheduling information and then demodulated, respectively. Channels other than those described above are transmitted to respective channel control parts, however, they do not affect the present invention and therefore are omitted.

Each demodulated data is transmitted as follows. The data channel is transmitted to a decoding part 203, the control channel to a control signal processing part 204, and the up link common pilot channel (UL-CPICH) to a channel measurement part 205. The decoding part 203 performs decoding processing of user data and transmits it to an upper layer 206. The control signal processing part 204 takes out control data and transmits it to the upper layer 206. Control data relating to the control of the channel demodulation part 202, the decoding part 203, and the scheduling is transmitted to each block. The channel measurement part 205 measures the received quality when the up link common pilot channel is a measurement pilot channel and transmits it to the upper layer 206 as measurement data and at the same time, transmits the received quality to a CQI calculation part 207. On the other hand, when the up link common pilot channel is a demodulation pilot channel, the channel measurement part 205 calculates reference data (amplitude, phase, frequency variation quantities, etc., of the up link data channel) for channel demodulation and transmits it to the channel demodulation part 202. The CQI calculation part 207 calculates a CQI from the received quality and transmits it to the upper layer 206 as a CQI value.

On the other hand, triggered by a transmission request from the upper layer 206, user data and control data are input to a coding part 208. Further, scheduling information is input from the upper layer 206 to a scheduling part 209. The user data and control data coded in the coding part 208 are input to a channel modulation part 210. The channel modulation part 210 performs modulation processing of transmission data in an appropriate modulation scheme in accordance with scheduling information transmitted from the scheduling part 209. A transmission power control part 211 performs appropriate power control of each channel in accordance with an instruction of the scheduling part 209. The data modulated in the channel modulation part 210 is input to a transmission part 212 and subjected to power control and then transmitted from the transmission power control part 211. Other components of the base station do not relate to the present invention and therefore are omitted. The operation of each block is totally controlled by the upper layer 206. The channel measurement part 205 and the upper layer 206 or the CQI calculation part 207 constitute a cell edge determination step and an interference determination step. As the most appropriate one as the cell edge determination step and the interference determination step is the CQI calculation part 207. The upper layer 206 constitutes a table creation step.

It is easy to imagine that what significantly affects the increase/decrease of inter-cell interference is a mobile station on a cell edge rather than a mobile station at the center of a cell. Because of this, if it is possible to know a frequency band in which a mobile station on a cell edge transmits measurement pilot channels in a concentrated manner, it is made possible to average the interference that affects neighboring cells by avoiding the concentrated frequency band. A method for this is shown below.

First, in order to determine whether a mobile station is at the center of a cell or on a cell edge, it is possible to determine in a base station using, for example, a downlink CQI reported from the mobile station or other reported measurement values. During communication, it is also possible to use the received quality of a measurement pilot channel for determination. Several examples of measuring method are shown below. In a method that uses a downlink CQI, a certain CQI value is determined in advance as a threshold value for each cell, and it is determined that a mobile station that reports a CQI value better than the threshold value is located at the center of the cell and that a mobile station that reports a CQI value worse than the threshold value is located on a cell edge. The CQI value that is equal to the threshold value is included in either one.

Figure 13:
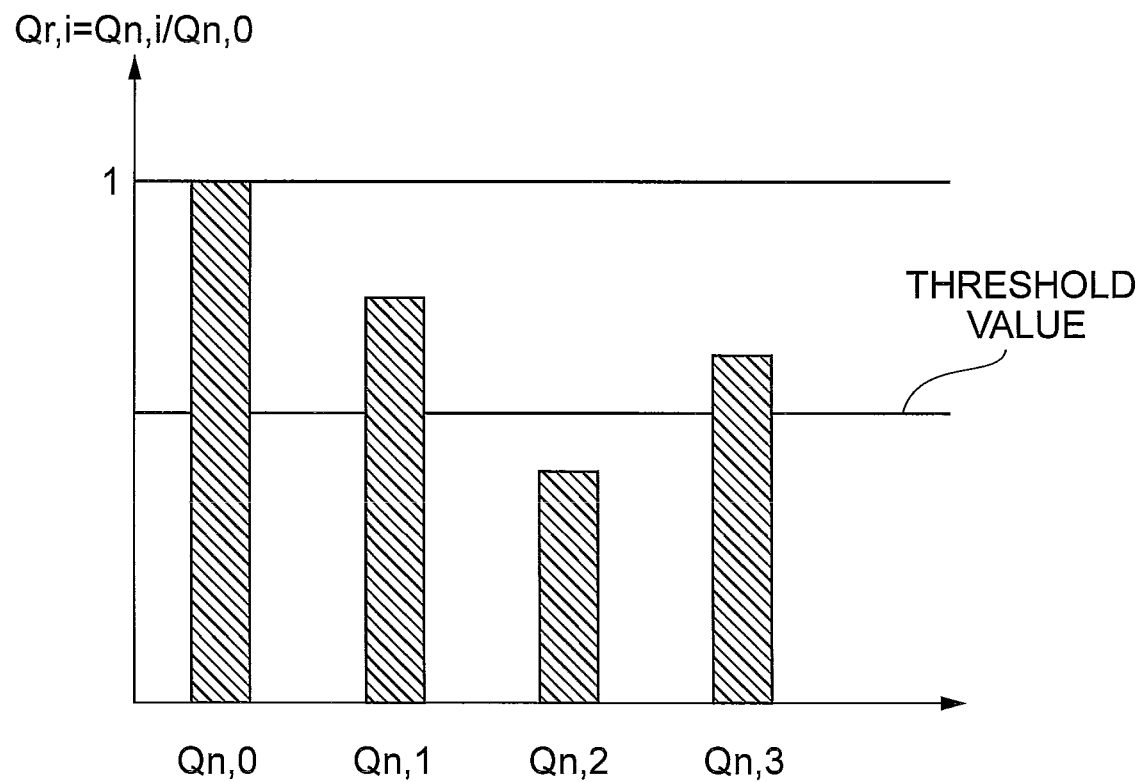
FIG. 13 is a diagram showing a threshold value of a relative quality $Q_{r,i}=(Q_{n,i}/Q_{n,0})$.

Further, as shown in FIG. 13, there is another method, in which relative quality $Q_{r,i}=(Q_{n,i}/Q_{n,0})$ that is obtained from received quality $Q_{n,0}$ of a cell in the serving area and received quality $Q_{n,i}$ of neighboring cells (i is the number of neighboring cells and i=3, in the example) is compared with a threshold value and when all of the values of $Q_{r,i}$ are smaller than the threshold value, the cell is determined to be located at the center of the cell and when at least one of them is larger than the threshold value, the cell is determined to be located on a cell edge. As the received quality to be measured, SIR, SINR, SNR, CIR, path loss, etc., are used. In this example, because $Q_{r,1}$ and $Q_{r,3}$ exceed the threshold value, the mobile station is determined to be one located on a cell edge. If the threshold value to be used in determination and measured value to be used are broadcasted or notified to the mobile stations individually, it is possible to perform any of the above-mentioned methods in the mobile station rather than in the base station and for the mobile station to notify the base station of the result.

Next, in order to determine which frequency band the mobile stations on a cell edge concentrate in, it is possible to determine by calculating the total CQI of the uplink measurement pilot channel that the mobile station determined to be located on a cell edge transmits and determining whether the total CQI is larger than a certain threshold value. When the total CQI is larger than the certain threshold value, it is determined that the mobile stations are arranged so as to concentrate in one and the same frequency band. This is because a difference in CQI between a mobile station located on a cell edge and another mobile station located on a cell edge in the same cell is comparatively small, and therefore, if the number of mobile stations that use the same frequency band increases, the total CQI increases in value accordingly. This example is an example in which it is assumed that a smaller CQI means better quality. If it is assumed that a larger CQI means better quality, it is necessary to sum values calculated "by subtracting a CQI from the maximum CQI". Hereinafter, explanation is given on the assumption that a smaller CQI means better quality.

Figure 14A:
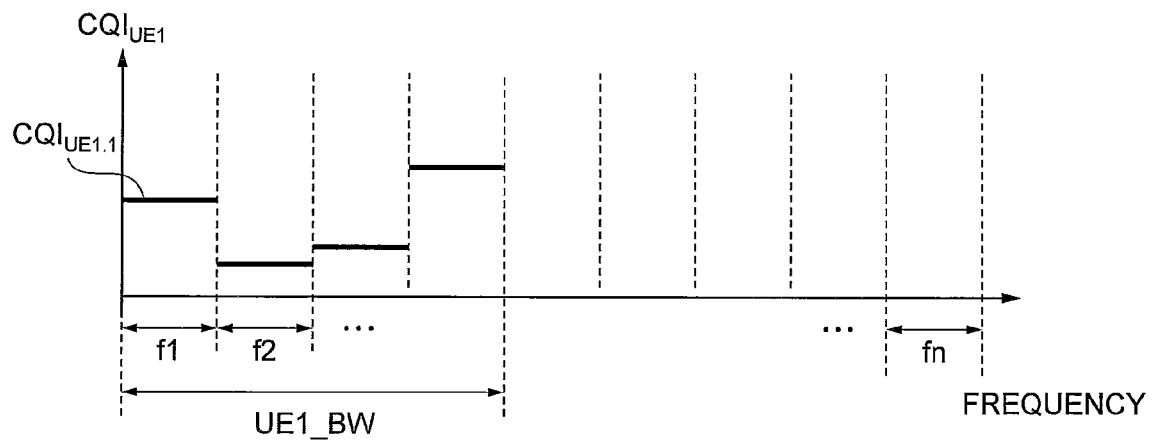
FIG. 14A-14c are conceptual diagrams when a base station according to the first embodiment calculates a total of CQI based on the measurement pilot channel of a mobile station on a cell edge.
Figure 14B:
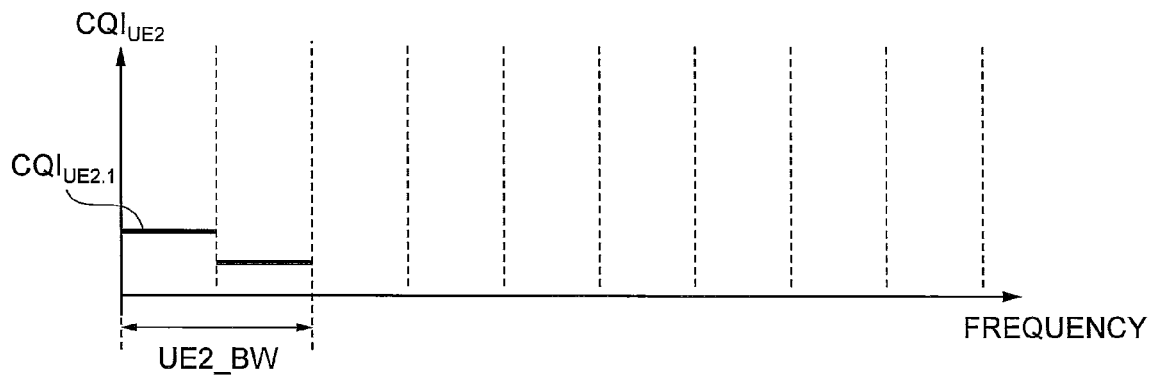
Figure 14C:
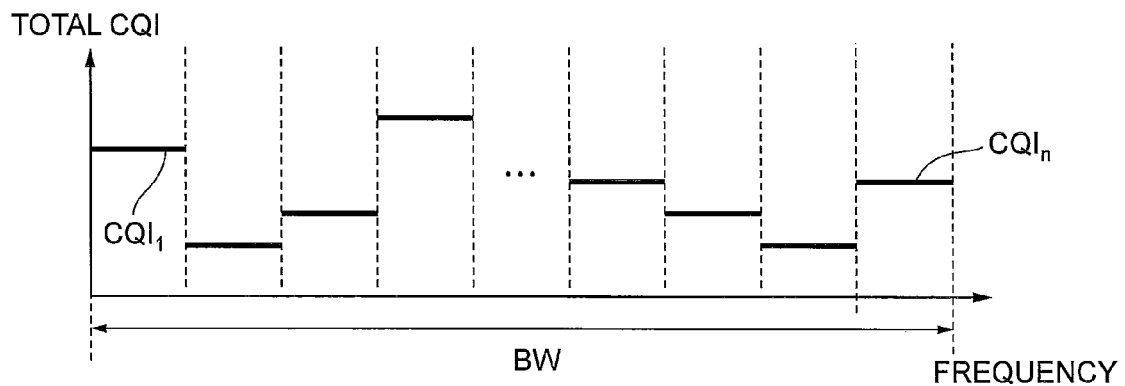

FIG. 14A-14C show conceptual diagrams of a calculation method of total CQI. It is assumed that a mobile station UE1 and a mobile station UE2 are arranged on a cell edge in a certain cell. It is also assumed that a transmission band width UE1_BW of the mobile station UE1 is divided into f1 to f4 and a transmission band width UE2_BW of the mobile station UE2 is divided into f1 and f2. In this case, $CQI_{UE1,1}$ in FIG. 14A is a CQI calculated in the base station using a measurement pilot channel from the mobile station UE1 in f1. Similarly, $CQI_{UE2,1}$ in FIG. 14B is a CQI calculated in the base station using a measurement pilot channel from the mobile station UE2 in f1. The same calculation of CQI is performed in all of the mobile stations on a cell edge in the cell and the results are summed for each divided frequency band across the system band width BW to obtain the total CQI in each frequency band. In FIG. 14C, the total value of $CQI_1$ of $CQI_{UE1,1}$ and $CQI_{UE2,1}$ is the total CQI.

The base station creates a table (interference information indicator table) that shows relative magnitudes of interference in a certain frequency band by comparing the total CQI for each frequency band calculated by the above-mentioned method and an interference determination threshold value determined in advance across the system band width. Specifically, when the total CQI in a certain frequency band is larger than the interference determination threshold value, it is determined that the amount of interference is large in that region and the corresponding value in the interference information indicator table is set to 1. On the contrary, when smaller, the value is set to 0. Here, each frequency band is caused to match with the minimum transmission band width of the measurement pilot channel.

FIG. 15 is an example showing a relationship between the total CQI and the interference determination threshold value. FIG. 16 is an example of the interference information indicator table in FIG. 15. When the minimum transmission band width is 1.25 MHz, the transmission band width BW is divided into 16 regions each having a band width of 1.25 MHz, that is, f1 to f16, as shown in FIG. 15. The total CQI in f1 is larger than the interference determination threshold value, and therefore, 1 is set to the box of f1 in the interference information indicator table in FIG. 16.

Figures 17, 18:
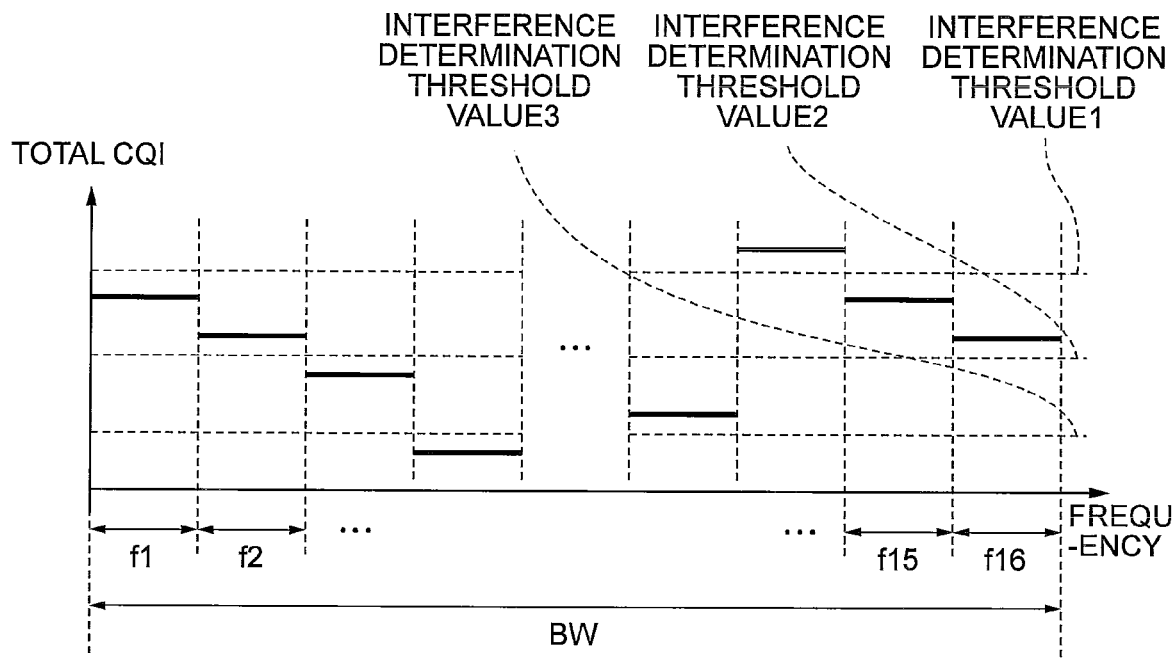
FIG. 17 is a diagram showing an example when the magnitude of interference is determined by a plurality of interference determination threshold values.
FIG. 18 is a diagram showing an example of an interference information indicator table of a plurality of cells.

It may also be possible to prepare a plurality of interference determination threshold values, not limited to one. An example in which a plurality of threshold values is used is shown in FIG. 17. In FIG. 17, three interference determination threshold values are prepared and there are four patterns of relationship of magnitude in comparison with the total CQI, and therefore, for example, one of values 0 to 3 is set in the interference information indicator table.

If expressed by a general expression, the number of bits x for the minimum transmission band width required when n interference determination threshold values are used is expressed by mathematical expression (1).

$$x=\lceil \text{Log}_2(n+1) \rceil \qquad \text{[Mathematical expression 1]}$$

For example, when the system band width is 20 MHz, the minimum transmission band width of the measurement pilot channel is 1.25 MHz, and one interference determination threshold value is used, the number of bits required for creating the interference information indicator table is (20/1.25)×1=16 bits.

The interference information indicator table is notified from the base station to the mobile stations on a cell edge individually via a physical downlink control channel or downlink data channel, or is reported to the whole cell via a broadcast channel and a mobile station determined to be located on a cell edge from the downlink CQI or transmission power acquires it from the broadcast channel.

Although a method for creating an interference information indicator table using CQI is explained here, this is not limited but the measured received quality may be used as it is. Further, the intensity of uplink received signal may be used. When the intensity of received signal is used, a measurement is made in units of resource blocks or in units of subcarriers, an average value is found in accordance with the minimum band width of the measurement pilot channel, and an interference information indicator table is created from comparison between the average value and a threshold value.

FIG. 18 is an example showing interference information indicator tables of a plurality of cells received by a certain mobile station. FIG. 18 shows a table that has put together into one the interference information indicator tables received from the cell 1 to cell 3 in the mobile station and it is assumed that the respective frequency band widths are divided into 16 frequency bands (the minimum transmission band width is assumed to be 1.25 MHz) and the magnitude of interference is expressed by one bit. The mobile station determines a frequency band in which the inter-cell interference seems to be least from the above-mentioned interference information indicator table and transmits the measurement pilot channel in the determined frequency band. In this case, it is possible for the base station to receive the measurement pilot channel in a frequency band with low interference, and therefore, it is possible to perform scheduling for the mobile station based on an excellent uplink CQI.

A method for determining a frequency band with less inter-cell interference from the above-mentioned plurality of interference information indicator tables is shown below. Two methods by which the mobile station receives an interference information indicator table from a cell in the serving area and neighboring cells are shown. Even if either method is used, the present invention is not affected. The neighboring cells mean a group of cells with quality equal to or higher than a certain level and as information by which the mobile station determines quality equal to or higher than a certain level, for example, a downlink CQI, path loss, SINR, etc., are used. Further, the maximum number of cells to be used as a peripheral cell may be defined. The maximum number of cells may be common to the system or may be determined for each base station the peripheral environment being taken into consideration and then notified to the mobile station.

The first method by which the mobile station receives an interference information indicator table is a method in which the mobile station is notified directly from a cell in the serving area and neighboring cells or the mobile station receives the reported interference information indicator tables respectively. The second method by which the mobile station receives an interference information indicator table is a method in which a base station in a cell in the serving area notifies or reports an interference information indicator table including information about the cell in the serving area and the neighboring cells.

The base station establishes cell-to-cell communication between base stations at certain time intervals in order to acquire/update the peripheral cell information and holds the interference information indicator tables of the plurality of neighboring cells. Alternatively, it may also be possible for the base station to acquire/update the interference information indicator tables of the neighboring cells by the periodic report of the interference information indicator tables of the neighboring cells received by the mobile station to the base station. In the case of the above-mentioned method by the report from the mobile station, if all of the mobile stations notify the base station of information, its overhead increases. Because of this, it is recommended to cause only a mobile station that satisfies a certain criterion, for example, a mobile station the CQI of which is lower than a certain threshold value, to make a report.

The mobile station creates a new table from the received interference information indicator table by adding a value(s) in accordance with the transmission band width of the measurement pilot channel for each mobile station. FIGS. 19(a) to 19(c) are tables that are created when the transmission band widths are 1.25 MHz, 5 MHz, and 10 MHz, respectively. The smaller value shown in these table means low interference that affects cells other than the cell in question. That is, in FIG. 19(a), it is determined that interference is least in f11 and f13 where the value is 0. Similarly, in FIG. 19(b), it is determined that interference is least in f10 to f13 where the value is 2 and in FIG. 19(c), it is determined that interference is least in f8 to f15 and f9 to f16 where the value is 8. As described above, a new table (interference information indicator table on the mobile station side) is created in accordance with the transmission band width of the measurement pilot channel of the mobile station, and therefore, it is made possible to accurately determine the state of interference in accordance with the frequency band width of the measurement pilot channel and determine a frequency band with low interference as a frequency band of the measurement pilot channel.

In the case where a frequency band capable of transmitting the measurement pilot channel cannot be set freely in order to secure orthogonality and frequencies are aligned, when the transmission bandwidth is 5 MHz, the table shown in FIG. 19(d) is created and when the transmission band width is 10 MHz, the table shown in FIG. 19(e) is created. That is, it is determined that, in FIG. 19(d), interference is least in f9 to f12 where the value is 4 and in FIG. 19(e), it is determined that interference is least in f9 to f16 where the value is 8. As described above, even when the setting of a frequency band of the measurement pilot channel cannot be done freely in order to secure orthogonality, the interference information indicator table is created by summing the values registered in the same frequency band without duplication, and therefore, it is made possible to appropriately create an interference information indicator table.

Figures 20, 21:
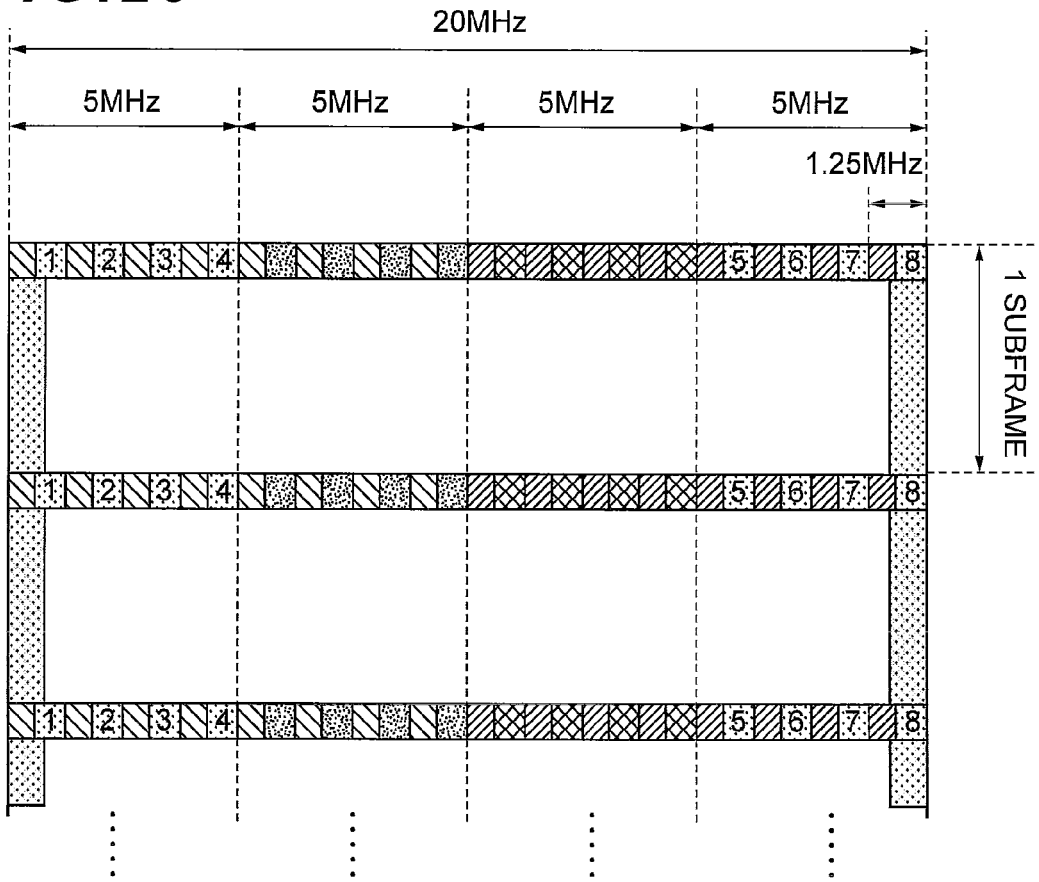
FIG. 20 is a diagram showing another example of channel mapping of measurement pilot channels in which the transmission frequency band is restricted.
FIG. 21 is a diagram showing an example of an interference information indicator summed in accordance with the transmission band width of the measurement pilot channel in which the transmission frequency band is restricted.

A method for creating an interference information indicator table of a mobile station when the frequency band of a measurement pilot channel to be transmitted by the mobile station is limited in advance, as shown in FIG. 20, is described below. In FIG. 20, the transmission band width of the measurement pilot channel of the mobile station on a cell edge is limited to 1.25 MHz and further, it is arranged in a 5 MHz band on both ends of the 20 MHz band. On the other hand, the transmission band width of the measurement pilot channel of the mobile station at the center of the cell is limited to 5 MHz or 10 MHz. The measurement pilot channels in different transmission band widths are multiplexed in the distributed arrangement. This is for the purpose of limiting the transmission band width of the measurement pilot channel of the mobile station on a cell edge because the wider the transmission band width of the measurement pilot channel becomes, the more the transmission power is required, and thus performing power-saving while ensuring the quality of the measurement pilot channel.

The base station determines an appropriate transmission band width of a measurement pilot channel using the reported measurement value (CQI, path loss, etc.) from the mobile station. During the period of communication, it may also be possible to use the measurement pilot channel as materials for determination. The determined transmission band width of the measurement pilot channel of the mobile station is notified to the mobile stations individually. The mobile station creates a new table by adding a value (s) in accordance with the notified transmission band width of the measurement pilot channel and the frequency band that can be used. An example is given using the interference information indicator table in FIG. 19(a). When it is notified that the transmission band width of the measurement pilot channel of the mobile station is 1.25 MHz, it is only required for the mobile station to calculate the range of 5 MHz on both ends. That is, the interference information indicator table created in the mobile station is such one as shown in FIG. 21 and it is determined that interference is least in f13. In this case, the determination as to whether or not the mobile station is on a cell edge can be made from the transmission band width of the measurement pilot channel notified from the base station, and therefore, it is not necessary for the mobile station side to make the determination.

In the method described above, the mobile station uniformly sums the interference information indicator tables received from a cell in the serving area and a plurality of neighboring cells without distinction. However, in actuality, if a nearby base station (base station in the cell in the serving area) and a distant base station (base station in a peripheral cell) are compared, the influence of interference by the distant base station is relatively smaller than that by the nearby base station when transmission is made at the same power. Because of this, it is possible to more accurately determine the amount of interference by summing the interference information indicator tables after weighting them than by summing them uniformly.

Figures 22, 23:
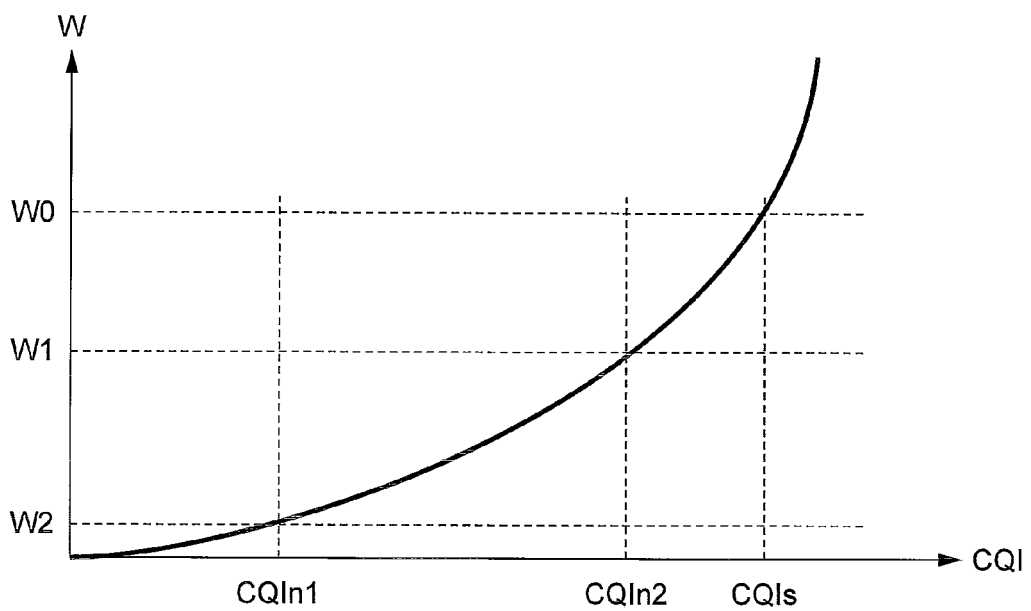
FIG. 22 is a diagram for explaining a relationship between the CQI value and the weighting factor when weighting is performed in accordance with the quality of the downlink CQI.
FIG. 23 is a diagram showing an example of an interference information indicator table when predetermined weighting is performed for the interference information indicator table shown in FIG. 18.

FIG. 22 is an example when weighting is performed according to the quality of CQI. The horizontal axis in FIG. 22 represents the CQI value and the vertical axis represents a weighting factor W. In the figure, $CQI_s$, $CQI_{n1}$, $CQI_{n2}$ denote the CQI value in a cell in the serving area, a peripheral cell 1, and a peripheral cell 2, respectively. Further, $W_0$, $W_1$, $W_2$ denote the weighting factors for $CQI_s$, $CQI_{n1}$, $CQI_{n2}$, respectively.

The mobile station receives the interference information indicator tables of the cell in the serving area and the neighboring cells and at the same time, finds a weighing factor from the CQI value. Then, the mobile station creates a new table by multiplying the interference information indicator table in the corresponding cell by the obtained weighting factor. After that, the mobile station creates a table similar to that in FIGS. 19(a) to 19(e) for each transmission band width of the measurement pilot channel.

FIG. 23 shows an example of an interference information indicator table created by a mobile station with a transmission band width of 1.25 MHz of the measurement pilot channel when weighting is performed for the interference information indicator table shown in FIG. 18 on the assumption that the cell 1 is a cell in the serving area, the cells 2 to 3 are neighboring cells, and $W_0=1$, $W_1=0.5$, and $W_2=0.3$.

Although it is possible for the mobile station to determine a frequency band with low interference from the interference information indicator table created by the mobile station itself, it is unclear to the base station which frequency band has low interference. Further, if the mobile station determines, of its own accord, a frequency band in which a measurement pilot channel is transmitted, there arise problems that load is concentrated in a specific frequency, that scheduling becomes complicated, etc. Because of this, it is necessary to notify the base station of a frequency band in which the mobile station desires to transmit a measurement pilot channel, that is, a frequency band in which the mobile station has determined interference is less. Hereinafter, such a notification method is shown in accordance with each of various cases.

First, a method for notifying a frequency band by random access procedure when the mobile station is not connected with the base station is shown. It is assumed here that the transmission band width of the measurement pilot channel of the mobile station is specified in advance by the base station or known because it is already defined. The mobile station selects at least one frequency band with low interference (with smaller value) from the received interference information indicator table and notifies the base station of the positional information about the frequency band. The information to be notified is included in a random access channel or in a physical uplink control channel and resources (frequency band, spreading code, etc.) of the measurement pilot channel are allocated from the base station via a physical downlink control channel.

Next, a method for making a notification for the purpose of changing a frequency band to one with low interference when the mobile station is connected with the base station is shown. The mobile station selects at least one frequency band with low interference (smaller value) than that currently allocated from the received interference information indicator table and notifies the base station of the positional information of the frequency band. The information to be notified is included in a random access channel or in a physical uplink control channel and resources (frequency band, spreading code, etc.) of the measurement pilot channel are reallocated from the base station via a physical downlink control channel. At this time, it is also possible for the base station to change the frequency band width of the measurement pilot channel of the mobile station within the performance range of the mobile station as well as reallocating resources. Regardless of the presence/absence of the connection between the mobile station and the base station, it is possible to reduce the probability of collision of a random access channel by using, on a priority basis, a frequency band that has been determined to have low interference from the interference information indicator table when transmitting the random access channel.

In both cases, when two or more of the same minimum values are included in the interference information indicator table, at least one is selected randomly from the plurality of frequency bands.

It is preferable to adopt a sufficiently long frequency with which the mobile station receives the interference information indicator table so as to prevent power from being consumed by frequent reception by the mobile station. However, it is possible for the base station to update with a short frequency in order to reflect the state of interference immediately. For example, there is a method for updating the interference information indicator table each time a CQI is reported. Methods by which the mobile station determines an update frequency of an interference information indicator table may included a method by which the mobile station itself determines an update frequency of the interference information indicator table based on the moving speed, transmission power, CQI, intermittent reception intervals, etc., of its own, a method determined by the system, and a method in which an update frequency is notified from the base station.

The methods described above are those in which the uplink throughput is improved by selecting a frequency band with low interference to suppress interference, however, no specific control is taken as to the transmission power of the uplink data channel. It is possible, however, to obtain an effect to further suppress interference by determining the transmission power by taking into consideration each value of the interference information indicator table in addition to the target quality, path loss, and the amount of interference when the mobile station transmits the uplink data channel.

As already explained in FIG. 7, in order for the mobile station to satisfy the target quality Target1, the transmission power Tx1 that compensates for the path loss Ptl1 and the amount of interference Intf1 is required. Here, the target quality Target1 and the amount of interference Intf1 are reported in advance in the cell or notified to the mobile stations individually. It is possible to find the path loss Ptl1 from a difference between the transmission power of the down link common pilot channel of the base station and the reception power of the down link common pilot channel actually received by the mobile station.

Here, the amount of interference Intf1 is the amount of interference given to the whole cell but not found for each frequency band. That is, the occurrence of a difference between the amount of interference Intf1 and the actual amount of interference in the allocated resource means that there is a possibility that too small or too large a transmission power Tx1 may be requested. The mobile station according to the present embodiment performs transmission power control using the interference information indicator table in order to compensate for the amount of interference for each frequency band. A method of transmission power control is shown below.

First, if the value in the interference information indicator table of a cell in the serving area, which corresponds to a frequency band in which transmission resources of the uplink data channel are included, is a value indicative of that interference given to the neighboring cells is much (interference is much), transmission is made after reducing the transmission power by a fixed step $\Delta S1$. In this case, the transmission power will be $Tx1-\Delta S1$. On the contrary, if the value in the interference information indicator table of the cell in the serving area is a value indicative of that interference given to the neighboring cells is less (interference is less), transmission is made after increasing the transmission power by a fixed step $\Delta S2$. In this case the transmission power will be $Tx1+\Delta S2$.

Next, if the value in the interference information indicator table of the peripheral cell, which corresponds to a frequency band in which transmission resources of the uplink data channel are included, is a value indicative of that interference is much, transmission is made after increasing the transmission power by a fixed step $\Delta N1$. In this case, the transmission power will be $Tx1+\Delta N1$. On the contrary, if the value in the interference information indicator table of the peripheral cell is a value indicative of that interference is less, transmission is made after reducing the transmission power by a fixed step $\Delta N2$. In this case the transmission power will be $Tx1-\Delta N2$.

The effect that can be expected from the above-mentioned transmission power control is as follows. First, in the case where interference given to the neighboring cells by the cell in the serving area is taken into consideration (that is, interference given to the neighboring cells), when data transmission is made in a frequency band with much interference in the cell in the serving area, the transmission power is reduced, and therefore, interference given to the neighboring cells is reduced, and the quality of the neighboring cells is improved. On the contrary, when data transmission is made in a frequency band with low interference in the cell in the serving area, even if the transmission is increased, it is guaranteed that an increase in interference does not affect the neighboring cells so strongly because the amount of interference given to the neighboring cells is originally small, and therefore, reception errors are reduced in the base station because the transmission power is increased in the cell in the serving area and the throughput of the mobile station is improved.

On the other hand, in the case where interference given to the cell in the serving area by the neighboring cells (that is, interference given to the cell in the serving area) is taken into consideration, when data transmission is made in a frequency band with much interference in the peripheral cell, the transmission power is increased, and therefore, reception errors in the base station in the cell in the serving area are reduced and the throughput of the mobile station is improved. On the contrary, when data transmission is made in a frequency band with low interference in the peripheral cell, an unwanted increase in transmission power is suppressed by reducing the transmission power, leading to the power-saving in the mobile station.

It is assumed that $\Delta S1, \Delta S2, \Delta N1, \Delta N2$ described above are positive numbers including zero, respectively, and values reported in the cell, or notified to the mobile stations individually, or determined in the mobile station before the transmission of the uplink data channel is made.

The values that mean "interference is much" and "interference is less" simply mean "interference is much" when the value is 1 and "interference is less" when the value is 0 in the case where the values of the interference information indicator table are represented by one bit (0 or 1). When the values are represented by two or more bits, a certain threshold value is determined in advance in order to make a distinction between "interference is much" and "interference is less". The threshold value for the distinction may be notified in advance from the base station or may be determined by the mobile station of its own accord.

Further, it is possible to obtain the same effect as that in the case described above by increasing/decreasing the target quality rather than increasing/decreasing transmission power. When the target quality is Target1, the target quality in each case described above is $Target1-\Delta Q1$, $Target1+\Delta Q2$, $Target1+\Delta Q3$, and $Target1-\Delta Q4$, respectively. It is assumed that $\Delta Q1$ to $\Delta Q4$ are positive numbers and values reported in the cell, or notified to the mobile stations individually, or determined in the mobile station before the transmission of the uplink data channel is made.

Figure 24:
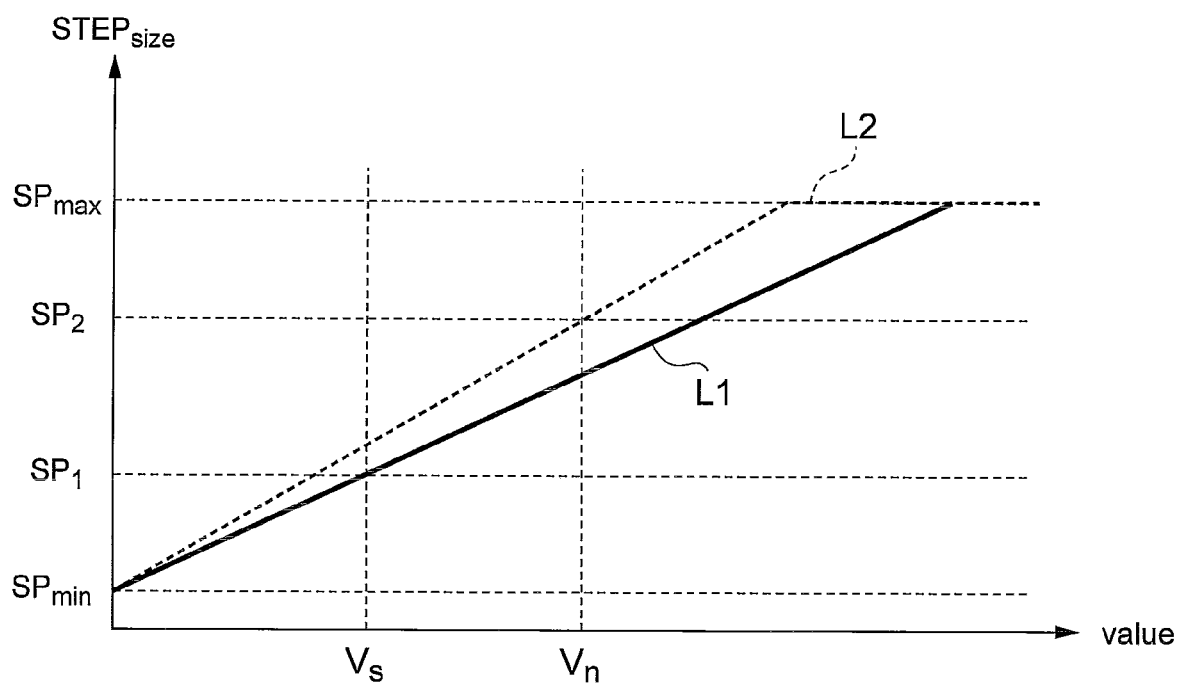
FIG. 24 is a diagram for explaining a relationship between registered values in an interference information indicator table and increment/decrement step widths of transmission power.
Figure 25:
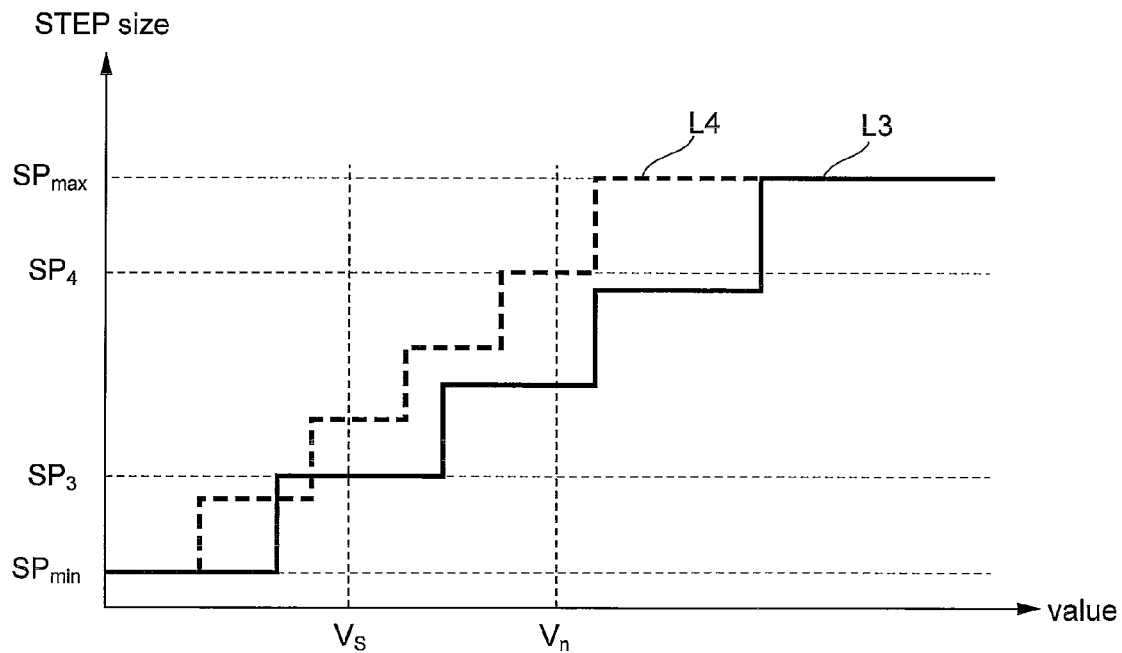
FIG. 25 is a diagram for explaining another relationship between registered values in an interference information indicator table and increment/decrement step widths of transmission power.

Although the case where the step width of increment/decrement in transmission power and the step width of increment/decrement in target quality are constant is shown, it may also be possible to appropriately change the step widths in accordance with the values in the interference information indicator table. Examples are shown in FIG. 24 and FIG. 25, in which an increment/decrement step width is found from the values in the interference information indicator table when the increment/decrement step width is in proportion to the values in the interference information indicator table. The values in the interference information indicator table may be those before weighting is performed or those after weighting is performed.

FIG. 24 is an example when the increment/decrement step width is in proportion to the values in the interference information indicator table. The horizontal axis in FIG. 24 represents the value in the interference information indicator table and the vertical axis represents the step width. In this case, $SP_{max}$ is the maximum step width and $SP_{min}$ is the minimum step width and they are notified from the base station or determined in the mobile station. $SP_1$, $SP_2$, are step widths when the values in the interference information indicator table are $V_s$, $V_n$, respectively. L1, L2 are straight lines that proportionally increase from $SP_{min}$ to $SP_{max}$ with a fixed slope, respectively.

Here, when the value in the interference information indicator table is calculated as $V_s$, the step width in the cell in the serving area is determined as $SP_1$ from the intersection with the straight line L1. Similarly, when the value in the interference information indicator table is calculated as $V_n$, the step width in the peripheral cell is determined as $SP_2$ from the intersection with the straight line L2. In FIG. 24, (number of cells×2) proportional lines are prepared although they are omitted for simplification of explanation.

On the other hand, FIG. 25 is a diagram when the step width is quantized in a fixed range instead of that the step width is in proportion to the value in the interference information indicator table. The horizontal axis in FIG. 25 represents the value in the interference information indicator table and the vertical axis represents the step width. In this case, $SP_{max}$ is the maximum step width and $SP_{min}$ is the minimum step width and notified from the base station or determined in the mobile station. $SP_3$, $SP_4$ are the step widths when the values in the interference information indicator table are $V_s$, $V_n$, respectively. L3 and L4 are straight lines that increase from $SP_{min}$ to $SP_{max}$, respectively, with the same step width or different step widths.

Here, when the value in the interference information indicator table is calculated as $V_s$, the step width in the cell in the serving area is determined as $S2_3$ from the intersection with the straight line L3. Similarly, when the value in the interference information indicator table is calculated as $V_n$, the step width in the peripheral cell is determined as $SP_4$ from the intersection with the straight line L4. In FIG. 25, (number of cells×2) straight lines are prepared although they are omitted for simplification of explanation.

It is preferable to set again the transmission power after the change and the target quality after the change by taking into consideration the increment/decrement step width both in the cell in the serving area and in the peripheral cell. As a method, it may be possible to simply sum both or to give priority to either of them when the result in the cell in the serving area is opposite to that in the peripheral cell. For example, when interference is much in the cell in the serving area and the peripheral cell, if priority is given to the received quality in the peripheral cell, the transmission power is reduced and if priority is given to the received quality in the cell in the serving area, the transmission power is increased. The method for doing setting again may be specified for each base station or may be determined in the mobile station.

When two or more neighboring cells are included in the interference information indicator table, it may also be possible for the mobile station to perform power control only when the results in all of the upper cells that are neighboring are the same. For example, when the number of neighboring cells is three, transmission power control is performed as follow. If all of the results of the three cells indicate much interference, the transmission power is reduced and if at least one of the results indicates low interference, the transmission power is not changed or the transmission power is increased. Although the control method for directly increasing/decreasing the transmission power of a mobile station as transmission power control is described as above, there may be a method for controlling the transmission power spectrum density (PSD) of a mobile station.

As described above, with the mobile communication system according to the first embodiment, a frequency band with lowest interference is determined as a frequency band of a measurement pilot channel from among uplink frequency bands, and therefore, it is possible to receive the measurement pilot channel in a frequency band with low interference in the base station and perform scheduling based thereon, and the throughput of the whole system can be improved as a result. Further, in a mobile station, it is possible to suppress the transmission power when transmitting data by selecting a frequency band with low interference, and therefore, it is made possible to realize reduction in power consumption. As a result, it is made possible to improve the throughput of the whole system while reducing power consumption.

Further, in the mobile communication system according to the first embodiment, the sum of the channel quality indicator (CQI) of the measurement pilot channel of a mobile station located on a cell edge is found for each frequency band with a fixed width in the base station and at the same time, the state of interference of each frequency band is determined by comparing the sum result and an interference determination threshold value, and an interference information indicator table is created in accordance with the determination result. Due to this, it is possible for the base station to notify the mobile station of the magnitude of inter-cell interference for each frequency band from the interference information indicator table only by making a measurement of CQI and a simple threshold determination. As a result, complicated calculations are no longer necessary, and therefore, it is made possible to realize reduction in complication and reduction in power consumption.

(Second Embodiment)

In the mobile communication system according to the first embodiment, a mobile station selects a frequency band with less influence of interference and suppresses interference. However, in the mobile communication system according to the first embodiment, the reference is only the quality of the measurement pilot channel from a mobile station on a cell edge, and therefore, if there happens to be a frequency band in which the number of mobile stations on a cell edge is small and the number of mobile stations at the center of the cell is large, the mobile stations tend to concentrate in the frequency band in question and there is a possibility that actual scheduling may become complicated. Because of this, in a mobile communication system according to a second embodiment, inter-cell interference is reduced by a method in which a mobile station divides and utilizes a system band width autonomously.

Hereinafter, the mobile communication system according to the second embodiment of the present invention is explained. In the mobile communication system according to the second embodiment, the configuration of a mobile station and the configuration of a base station are the same as those in the mobile communication system according to the first embodiment. However, in the mobile communication system according to the second embodiment, only the information of cells in the serving area is used from the interference information indicator table used in the first embodiment, and therefore, the circuits and the series of processing relating to the interference information indicator tables of neighboring cells are omitted from both the mobile station and the base station. Further, the method for determining a mobile station on a cell edge and the method for creating an interference information indicator table in the base station are the same as those in the mobile communication system according to the first embodiment. The interference information indicator table is notified from the base station to the mobile stations individually via a physical downlink control channel or downlink data channel, or reported to the whole cell via a broadcast channel and a mobile station determined to be located on a cell edge from the downlink CQI or transmission power acquires the interference information indicator table from the broadcast channel. The method for determining an update frequency of the interference information indicator table is the same as that in the mobile communication system according to the first embodiment.

A mobile station creates a new table from the received interference information indicator table of a cell in the serving area by adding a value (s) in accordance with the transmission band width of the measurement pilot channel for each mobile station. The method for creating a new table is the same as that in the mobile communication system according to the first embodiment, however, weighting processing is not necessary. Next, the mobile station selects a frequency band with a maximum value, that is, a region that gives the most significant interference to the neighboring cells. In this case, if two or more of the same maximum values are included in the interference information indicator table, at least one value is selected randomly from among the plurality of frequency bands. This utilizes the fact that the uplink interference does not increase in amount so much even if mobile stations concentrate in a certain frequency band because the orthogonality between mobile stations is maintained in a cell in the serving area. This is explained using FIG. 26, FIG. 27.

Figure 26:
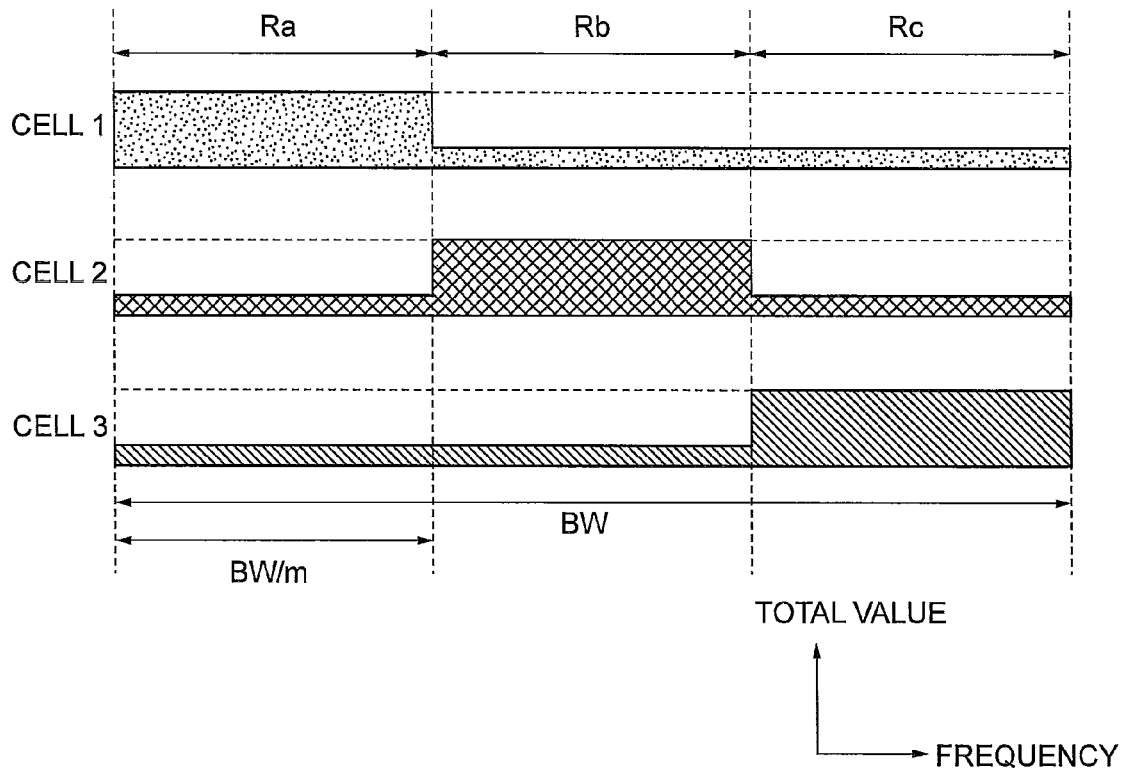
FIG. 26 is an example showing a relationship between frequency bands of cell 1 to cell 3 and registered values in an interference information indicator table in a mobile communication system according to a second embodiment of the present invention.
Figure 27:
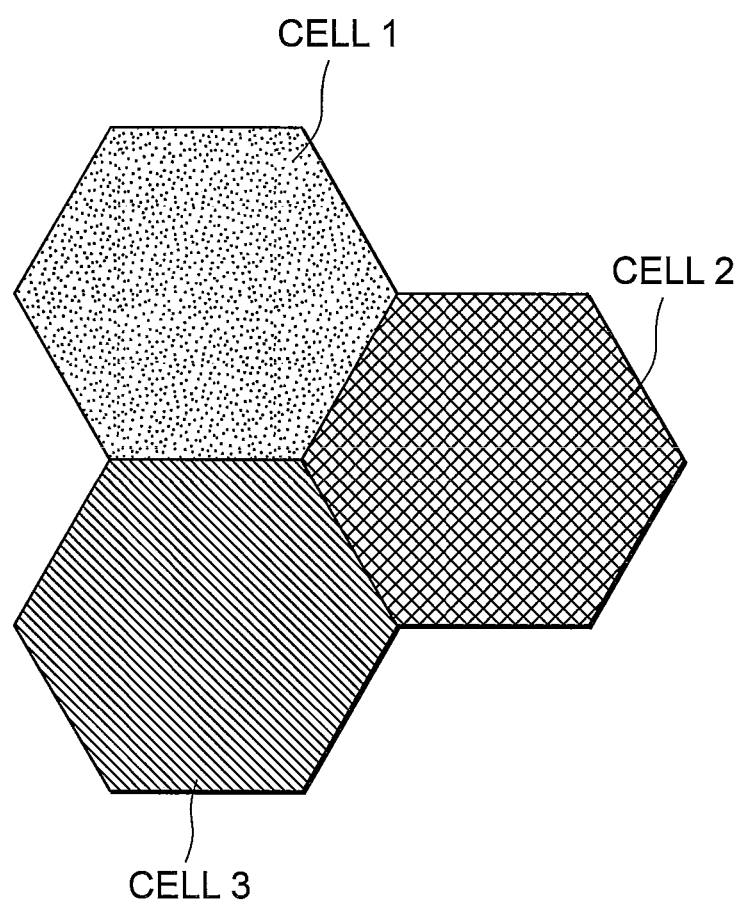
FIG. 27 is an arrangement diagram of cells corresponding to the cell 1 to cell 3 in FIG. 26.

FIG. 26 is an example showing a relationship between frequency bands in the cell 1 to cell 3 and values in an interference information indicator table in the mobile communication system according to the second embodiment. The horizontal axis in FIG. 26 represents the frequency and the vertical axis represents the sum value of the interference information indicator table in a certain frequency band. BW denotes a system band width and regions Ra to Rc are m divisions of BW, and its band width is BW/m. FIG. 27 is an arrangement diagram of cells corresponding to the cell 1 to cell 3 in FIG. 26. There may be a method in which a frequency band $BW_e$ for a cell edge is prepared and this is divided into m divisions and allocated instead of a method in which the whole system band width is used. In this case, the band width of each cell will be $BW_e/m$.

If it is assumed that the region Ra in the cell 1 gives interference most significantly (region with the maximum value in the interference information indicator table), mobile stations located on a cell edge of the cell 1 concentrate in the region Ra. In this case, in the cell 2 and cell 3, the amount of uplink interference from the cell 1 in the region Ra increases and the received quality (CQI) of the measurement pilot channel deteriorates, and on the other hand, the amount of uplink interference from the cell 1 decreases in the regions Rb and Rc and the received quality (CQI) of the measurement pilot channel improves. Because of this, the mobile stations in the cell 2 and cell 3 concentrate in the region Rb or Rc as a result.

Then, if the value of the region Rb is larger than that of Rc in the cell 2, the mobile stations located on a cell edge in the cell 2 concentrate in Rb and the mobile stations located on a cell edge in the cell 3 concentrate in the region Rc as a result. In this manner, the mobile stations located on a cell edge in each of the cell 1 to cell 3 are autonomously multiplexed and arranged in different frequencies, and therefore, it is possible to suppress the inter-cell interference.

As described above, with the mobile communication system according to the second embodiment, based on the new table created in the mobile station (interference information indicator table on the mobile station side), a frequency band with most interference is determined as a frequency band of the measurement pilot channel from among the uplink frequency bands, and therefore, it is possible to divide the frequency band used by the mobile stations located in different cells for each cell and it is made possible to suppress the inter-cell interference.

It is also possible to combine the transmission power control shown in the mobile communication system according to the first embodiment with the mobile communication system according to the second embodiment.

(Third Embodiment)

In the mobile communication system according to the second embodiment, the mobile station divides the system band width autonomously and thus reduces the inter-cell interference. However, in the mobile communication system according to the second embodiment, the mobile station autonomously determines a frequency band to use, and therefore, it is not possible to completely separate interference from a peripheral cell in a frequency band, compared to the case where the base station divides the frequency in advance, and it can be expected that the interference suppression effect is reduced. That is, in the example in FIG. 26, the mobile that uses the region Rb or Rc in the cell 1 exists and is given much interference from the cell 2 and cell 3, respectively. Because of this, in a mobile communication system according to a third embodiment, when the mobile station autonomously divides and utilizes the system band width, not only a cell in the serving area but also neighboring cells are taken into consideration.

Hereinafter, the mobile communication system according to the third embodiment of the present invention is explained. In the mobile communication system according to the third embodiment, the configuration of a mobile station and the configuration of a base station may be the same as those in the first embodiment.

In the third embodiment, it may also be possible to use the interference information indicator table in FIG. 28, which is obtained by subtracting the values in the neighboring cells (cell 2, cell 3 in the figure) from the values in the cell in the serving area (cell 1 in the figure) in the interference information indicator table in FIG. 18. FIG. 28 shows an example when the transmission band width of the measurement pilot channel of the mobile station is 1.25 MHz and weighting factors $W_0=1$, $W_1=0.5$, $W_3=0.3$ are multiplied in the cell 1 to cell 3, respectively, however, it may also be possible to create a table without multiplying weighting factors W. Next, the mobile station selects a frequency band with a maximum value in the interference information indicator table in FIG. 28, that is, a region given low interference from a peripheral cell. In this case, if two or more of the same maximum values are included in the interference information indicator table, at least one is selected randomly from among the plurality of frequency bands.

As described above, with the mobile communication system according to the third embodiment, based on the new table created in the mobile station (interference information indicator table on the mobile station side), a frequency band with most interference is determined as a frequency band of the measurement pilot channel from among the uplink frequency bands, and therefore, it is possible to divide the frequency band used by the mobile stations located in different cells for each cell and it is made possible to suppress the inter-cell interference.

It is also possible to combine the transmission power control shown in the mobile communication system according to the first embodiment with the mobile communication system according to the third embodiment.

(Fourth Embodiment)

In the mobile communication system according to the third embodiment, the mobile station autonomously divides the system band width and reduces the inter-cell interference. However, in the mobile communication system according to the third embodiment, interference given from a peripheral cell is calculated independently of the transmission band width of the measurement pilot channel of the mobile station, and therefore, close control of interference cannot be achieved. Because of this, in a mobile communication system according to a fourth embodiment, when a mobile station autonomously divides and utilizes a system band width, interference given from a peripheral cell is taken into consideration for each of the transmission band widths of the measurement pilot channel of the mobile station.

Hereinafter, the mobile communication system according to the fourth embodiment of the present invention is described. In the mobile communication system according to the fourth embodiment, the configuration of a mobile station and the configuration of a base station may be the same as those in the first embodiment.

Figures 29, 30:
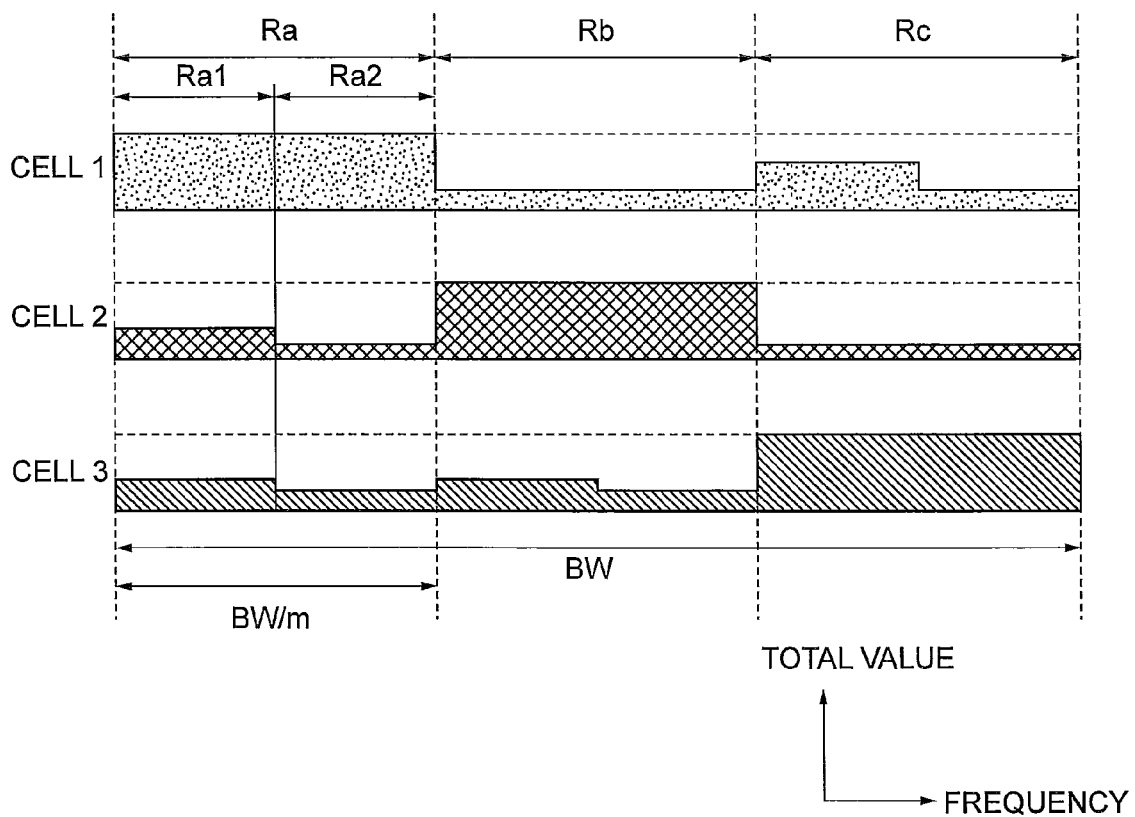
FIG. 29 is a diagram showing an example of an interference information indicator table summed in accordance with the transmission band width of measurement pilot channels in a cell in the serving area and a peripheral cell in a mobile communication system according to a fourth embodiment of the present invention.
FIG. 30 is an example showing a relationship between frequency bands of the cell 1 to cell 3 and registered values in an interference information indicator table in the mobile communication system according to the fourth embodiment.

FIG. 29 shows an example of an interference information indicator table used in the mobile communication system according to the fourth embodiment. The method for creating an interference information indicator table is the same as that in the first embodiment except in that cells in the serving area and neighboring cells are separated. Further, it is assumed that the determination method of a mobile station on a cell edge and the method for creating an interference information indicator table of cells in the serving area and neighboring cells are the same as those in the mobile communication system according to the first embodiment. The interference information indicator table is notified from the base station to the mobile stations individually via a physical downlink control channel or downlink data channel, or reported to the whole cell via a broadcast channel, and a mobile station determined to be located on a cell edge from the downlink CQI or transmission power acquires the interference information indicator table from the broadcast channel. The method for determining an update frequency of the interference information indicator table may be the same as that in the mobile communication system according to the first embodiment.

When the transmission band width of the measurement pilot channel of the mobile station is Bq, the mobile station selects a frequency band with a maximum value from among the sum of the values of the interference information indicator table in the cells in the serving area corresponding to a frequency band Fm (Fm=Bq×p) with a band width p times the transmission band width Bq (p is a natural number that satisfies p>1 and the transmission band width Fm after being multiplied by p is equal to or less than the maximum transmission band width of the mobile station). In this case, if two or more of the same maximum values are included in the interference information indicator table, at least one is selected randomly from the plurality of frequency bands. Further, a minimum value is selected from among the values of the neighboring cells included in the range of the frequency band Fm. If two or more of the same minimum values are included in the range of the frequency band Fm, at least one is selected randomly from among the plurality of frequency bands.

In the interference information indicator table shown in FIG. 29, Bq=1.25 MHz, p=4 and at this time, Fm will be 5 MHz. Because of this, when a region with a maximum value is searched for in the range of Fm=5 MHz from the interference information indicator table of the cell in the serving area, the result is the region in f13 to f16 and the region with a minimum value in the peripheral cell is the region in f13. From the above, the mobile station determines that a region in which the measurement pilot channel is transmitted is f13.

FIG. 30 is an example showing a relationship between the frequency bands in the cell 1 to cell 3 and the values in the interference information indicator table in the mobile communication system according to the fourth embodiment. The horizontal axis in FIG. 30 represents the frequency and the vertical axis represents the total value of the interference information indicator table in a certain frequency band. Further, BW denotes a system band width and the regions Ra to Rc are m divisions into which BW is divided and its band width is BM/m. It is assumed that Ra1 and Ra2 have the transmission band width of the measurement pilot channel. There may be a method in which the frequency band $BW_e$ for a cell edge is prepared and this is divided into m divisions and allocated instead of a method in which the whole system band width is used. At this time, the band width of each cell will be $BW_e/m$.

If it is assumed that the region Ra in the cell 1 is a region that gives interference most significantly (region that shows a maximum value in the interference information indicator table of the cell in the serving area), the mobile stations located on a cell edge of the cell 1 concentrate in the region Ra. In this case, if a mobile station compares Ra1 and Ra2 and finds that the region Ra2 is a region given low interference from a peripheral cell (region that shows a minimum value of the sum of the interference information indicator table in the peripheral cell), the mobile station determines that interference is least when transmitting the measurement pilot channel in the region Ra2. The same processing is performed also in the cell 2 and cell 3. In this manner, the mobile stations located on a cell edge in each of the cell 1 to cell 3 are autonomously multiplexed and arranged in different frequencies and a frequency band with less influence of interference on the peripheral cell is selected from among them, and therefore, it is made possible to further suppress the inter-cell interference.

In the mobile communication system according to the fourth embodiment, it is assumed that an arbitrary frequency band is selected from the frequency band Fm if the interference information indicator table of the peripheral cell is not received.

As described above, with the mobile communication system according to the fourth embodiment, based on the new table created in the mobile station (interference information indicator table on the mobile station side), a frequency band with most interference in the cell in the serving area and with lowest interference in the peripheral cell is determined as a frequency band of the measurement pilot channel from among the uplink frequency bands. Because of this, the mobile stations located in different cells are multiplexed autonomously in different frequency bands and a frequency band with less significant influence of interference on the peripheral cell is selected in the range of the transmission bandwidth of the measurement pilot channel from among them, and therefore, it is made possible to further suppress the inter-cell interference.

It is also possible to combine the transmission power control shown in the mobile communication system according to the first embodiment with the mobile communication system according to the fourth embodiment.

Fifth Embodiment

Hereinafter, a mobile communication system according to a fifth embodiment of the present invention is described. The configuration of a mobile station and the configuration of a base station may be the same as those in the first embodiment. However, in the mobile communication system according to the fifth embodiment, only the information of neighboring cells is used from the interference information indicator table used in the mobile communication system according to the first embodiment, and therefore, the circuits and the series of processing relating to the interference information indicator table of cells in the serving area are omitted from both the mobile station and the base station. Further, the method for determining a mobile station on a cell edge and the method for creating an interference information indicator table in the base station are assumed to be the same as those in the mobile communication system according to the first embodiment. The interference information indicator table is notified from the base station to the mobile stations individually via a physical downlink control channel or downlink data channel, or reported to the whole cell via a broadcast channel and a mobile station determined to be located on a cell edge from the downlink CQI or transmission power acquires the interference information indicator table from the broadcast channel. The method for determining an update frequency of the interference information indicator table may be the same as that in the mobile communication system according to the first embodiment.

In the mobile communication system according to the fifth embodiment, the base station transmits frequency hopping pattern information (hereinafter, referred to as "FH information") of the measurement pilot channel to the mobile station along with the allocation information of radio resources. The FH information received in the mobile station is transmitted to the scheduling part 108 as scheduling information and used as a transmission pattern when transmitting the measurement pilot channel. The FH information may include a hopping pattern of a channel other than the measurement pilot channel. The interference information indicator table of the peripheral cell and the FH information are notified from the base station to the mobile stations respectively via a physical downlink control channel or downlink data channel, or reported to the whole cell via a broadcast channel, and a mobile station determined to be located on a cell edge from the downlink CQI or transmission power acquires the interference information indicator table from the broadcast channel.

In addition, the mobile station creates a new table from the received interference information indicator table of the peripheral cell by adding a value(s) in accordance with the transmission band width of the measurement pilot channel for each mobile station. The method for creating a new table is the same as that in the mobile communication system according to the first embodiment, however, weighting processing is not necessary. Next, the mobile station compares each value of the created table and a threshold value and determines a frequency band with a value larger than the threshold value. The threshold value is notified from the base station to the mobile stations individually via a physical downlink control channel or downlink data channel, or reported to the whole cell via a broadcast channel.

Figure 31:
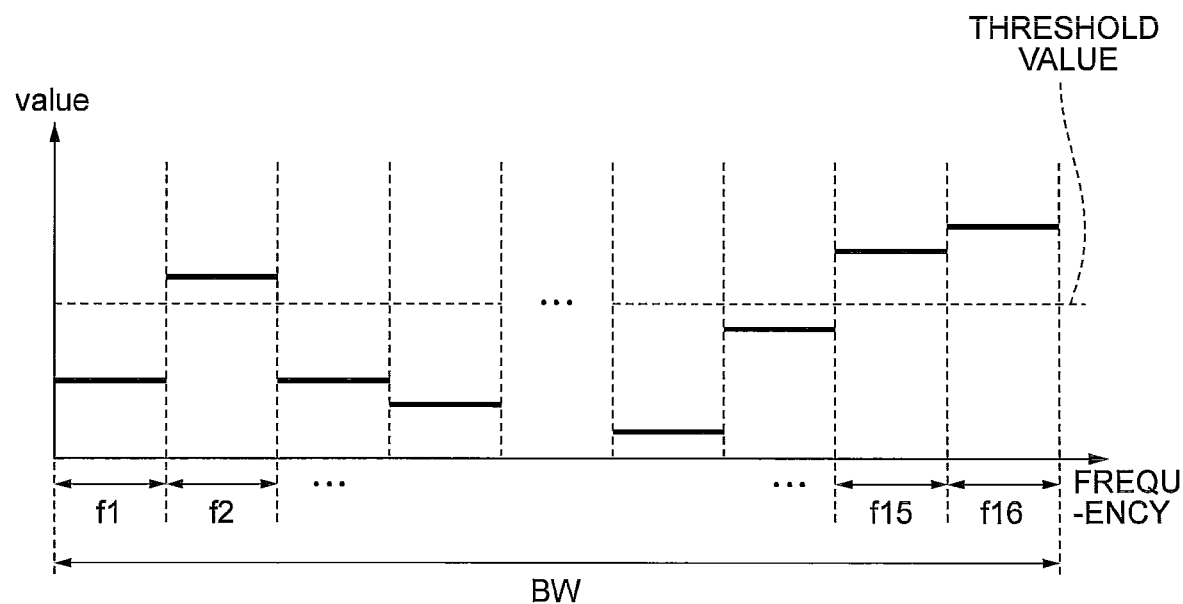
FIG. 31 is a diagram for explaining a relationship between registered values in an interference information indicator table of a peripheral cell and an interference judgment threshold value in a mobile communication system according to a fifth embodiment of the present invention.

FIG. 31 shows an example of a relationship between the above-mentioned threshold value and the new interference information indicator table of the peripheral cell. BW denotes a system band width and is 20 MHz in FIG. 31. The frequency bands f1 to f6 show the transmission band width of the measurement pilot channel, which is 1.25 MHz in FIG. 31. In this case, the mobile station compares each value of f11 to f16 and the above-mentioned threshold value and stores the frequency bands with a value exceeding the threshold value. In the example shown in FIG. 31, f2, f15, and f16 are determined to exceed the above-mentioned threshold value.

Figure 32:
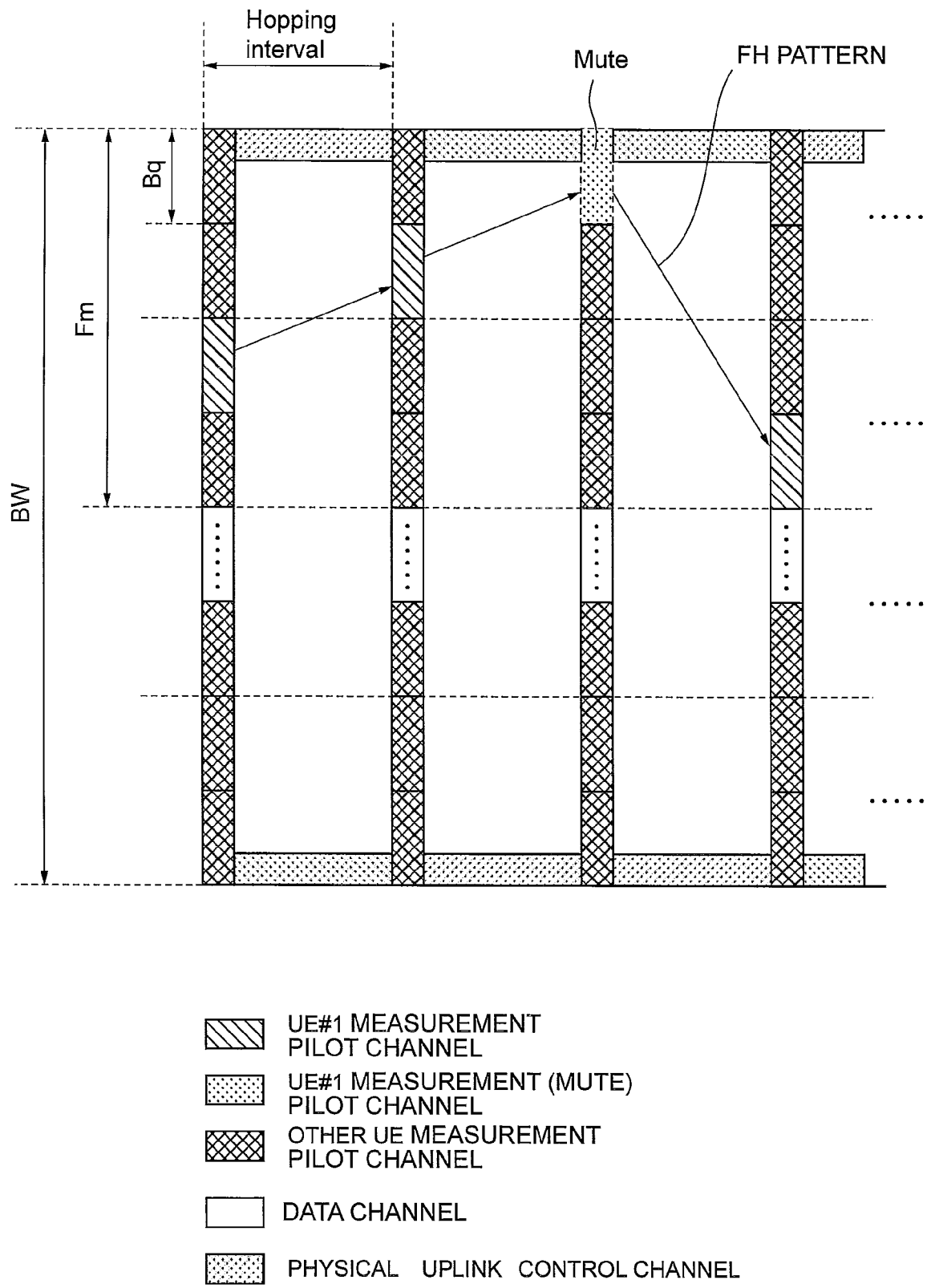
FIG. 32 is a diagram for explaining an example of frequency hopping control of measurement pilot channels in the fifth embodiment.

FIG. 32 is an example when transmitting the measurement pilot channel by hopping using the FH information. BW shown in FIG. 32 denotes a system band width and Bq denotes the transmission band width of the measurement pilot channel of the mobile station. Fm denotes a frequency band with a band width p times Bq (p is a natural number that satisfies p>1 and the transmission band width Fm after being multiplied by p is less than or equal to the maximum transmission band width of the mobile station) and Fm=Bq×p holds.

The mobile station transmits the measurement pilot channel in different frequencies at regular time intervals (Hopping interval) in accordance with the FH pattern included in the FH information. In this case, if the radio resource allocated in accordance with the FH pattern is the same as that in the frequency band that exceeds the threshold value explained in FIG. 31, the mobile station does not transmit the measurement pilot channel of the frequency band but mutes the frequency band.

Because it is not possible for the base station to measure a CQI (Channel Quality Indicator) of the measurement pilot channel of the muted frequency band, the base station does not allocate a resource in the frequency band to the mobile station that mutes transmission. The mobile station performs transmission in accordance with the notified FH pattern until the interference information indicator table of the peripheral cell is updated.

As described above, with the mobile communication system according to the fifth embodiment, different frequency bands are used by frequency hopping and on the other hand, a frequency band with most interference in the peripheral cell is determined from among the uplink frequency bands, and scheduling is performed so that the measurement pilot channel is not transmitted in the frequency band in question, and therefore, it is made possible to reduce the inter-cell interference because the influence of interference given to the peripheral cell is averaged by frequency hopping and at the same time, a resource is no longer allocated to the frequency band significantly given inter-cell interference from the peripheral cell.

It may also be possible to perform transmission at reduced power rather than muting the measurement pilot channel completely. At this time, the width to be reduced needs to be fixed or a fixed ratio with respect to the original transmission power needs to be used.

It is also possible to combine the transmission power control shown in the first embodiment with the fifth embodiment. For example, when a frequency band with most interference in the peripheral cell is determined and scheduling is performed at a reduced transmission power of the measurement pilot channel in the frequency band in question, it is made possible to reduce the inter-cell interference because the influence of interference is averaged by frequency hopping and at the same time, the transmission power of the frequency band significantly given inter-cell interference from the peripheral cell is reduced.

(Sixth Embodiment)

In a sixth embodiment, a method is explained, which uses not only a measurement pilot channel but also a demodulation pilot channel in order to determine the amount of interference. Because the measurement pilot channel is transmitted in a state where a plurality of mobile stations is multiplexed in the same frequency band, there is a possibility that measurement errors may occur by the inter-cell interference due to the collapse of orthogonality in the cell, however, the band of the demodulation pilot channel is occupied by one mobile station, and therefore, the interference between mobile stations is less than that of the measurement pilot channel. An object of the present embodiment is to correct measurement errors using the demodulation pilot channel having the previously-described characteristics and create an interference information indicator table with higher precision.

Hereinafter, the mobile communication system according to the sixth embodiment of the present invention is described. FIG. 33 is a block diagram showing an example of the configuration of a base station in the sixth embodiment of the present invention. The configuration of a mobile station may be the same as that in the first embodiment. When the up link common pilot channel is a demodulation pilot channel, the base station transmits reference data to the channel demodulation part 202 from the channel measurement part 205 and further, transmits the reference data also to an interference correction part 213. The interference correction part 213 calculates the CQI value from the reference data and creates correction data to correct measurement data and the CQI value for each mobile station, and transmits the data to the upper layer 206. The upper layer 206 corrects the measurement data and CQI value of the mobile station based on the correction data. As to the mobile station to which the demodulation pilot channel is not transmitted, the measurement data and CQI value are calculated as usual only by the measurement pilot channel.

The base station creates an interference information indicator table based on the corrected measurement data and CQI value. The interference information indicator table is created in accordance with the transmission band width of the measurement pilot channel of the mobile station using the method in either of the embodiments described above. The created interference information indicator table is notified from the base station to the mobile stations individually via a physical downlink control channel or downlink data channel, or reported to the whole cell via a broadcast channel, and a mobile station determined to be located on a cell edge from the downlink CQI or transmission power acquires the interference information indicator table from the broadcast channel. The method for determining an update frequency of the interference information indicator table is the same as that in the mobile communication system according to the first embodiment.

As described above, with the mobile communication system according to the sixth embodiment, the measurement data and CQI are corrected using the correction data created from the demodulation pilot channel, and the interference information indicator table is created based on the corrected data, and therefore, it is possible to create an interference information indicator table with high precision and because it is made possible to predict interference with high precision, it is made possible to further suppress the inter-cell interference.

It is also possible to combine the transmission power control shown in the mobile communication system according to the first embodiment with the mobile communication system according to the sixth embodiment.

The present invention is not limited to the embodiments described above but can be embodied in various modifications. In the embodiments described above, the sizes and shapes shown schematically in the attached drawings are not limited to those but can be appropriately modified in the scope in which the effects of the present invention are exhibited. Furthermore, it is possible to appropriately embody the present invention without departing from the scope of the object of the present invention.

The invention claimed is:

1. A base station apparatus comprising:
   a cell edge determination unit which determines whether or not a mobile station apparatus is located in a cell edge of a cell managed by said base station apparatus;
   a table creation unit which creates a first interference information indicator table that indicates an influence level, for each of a plurality of predetermined frequency bands, of inter-cell interference in the respective predetermined frequency bands at said mobile station apparatus;
   a transmission unit which transmits said first interference information indicator table to another base station apparatus;
   a receiving unit that receives a second interference information indicator table from said another base station apparatus, said second interference information indicator table indicating an influence level, for each of the plurality of predetermined frequency bands, of inter-cell interference in the respective predetermined frequency bands at a mobile station apparatus located in a cell managed by said another base station; and
   a scheduling part that allocates, to at least one mobile station apparatus located in the cell managed by said base station, a transmission resource, said allocation based on the influence levels indicated in said second interference information indicator table.

2. A mobile communication system comprising a mobile station apparatus and a base station apparatus, wherein:
   said base station apparatus comprises:
      a cell edge determination unit which determines whether or not said mobile station apparatus is located in a cell edge of a cell managed by said base station apparatus;
      a table creation unit which creates a first interference information indicator table that indicates an influence level, for each of a plurality of predetermined frequency bands, of inter-cell interference in the respective predetermined frequency bands at said mobile station apparatus;
      a transmission unit which transmits said first interference information indicator table to another base station apparatus;
      a receiving unit that receives a second interference information indicator table from said another base station apparatus, said second interference information indicator table indicating an influence level, for each of the plurality of predetermined frequency bands, of inter-cell interference in the respective predetermined frequency bands at a mobile station apparatus located in a cell managed by said another base station; and
      a scheduling part that allocates, to at least one mobile station apparatus located in the cell managed by said base station, a transmission resource, said allocation based on the influence levels indicated in said second interference information indicator table; and
   said at least one mobile station apparatus to which the transmission resource is allocated performs a data transmission in accordance with the allocation of said transmission resource.

3. A communication method of a base station apparatus that communicates with a mobile station apparatus, said method performed by the base station apparatus and comprising:
   determining whether or not said mobile station apparatus is located in a cell edge of a cell managed by said base station apparatus;
   creating a first interference information indicator table that indicates an influence level, for each of a plurality of predetermined frequency bands, of inter-cell interference in the respective predetermined frequency bands at said mobile station apparatus;
   transmitting said first interference information indicator table to another base station apparatus;
   receiving a second interference information indicator table from said another base station apparatus, said second interference information indicator table indicating an influence level, for each of the plurality of predetermined frequency bands, of inter-cell interference in the respective predetermined frequency bands at a mobile station apparatus located in a cell managed by said another base station; and
   performing scheduling to allocate, to at least one mobile station apparatus located in the cell managed by said base station, a transmission resource, said allocation based on said second interference information indicator table.

* * * * *